(12) United States Patent
Burton

(10) Patent No.: US 7,264,376 B2
(45) Date of Patent: Sep. 4, 2007

(54) ADJUSTER AND BRACKET ASSEMBLY

(75) Inventor: John E Burton, Ludington, MI (US)

(73) Assignee: Burton Technologies LLC, Ludington, MI (US)

( * ) Notice: Subject to any disclaimer, the term of this patent is extended or adjusted under 35 U.S.C. 154(b) by 171 days.

(21) Appl. No.: 10/728,365

(22) Filed: Dec. 4, 2003

(65) Prior Publication Data

US 2004/0196657 A1    Oct. 7, 2004

Related U.S. Application Data

(63) Continuation-in-part of application No. 10/290,090, filed on Nov. 7, 2002, now Pat. No. 6,974,321.

(51) Int. Cl.
*F21V 17/02*    (2006.01)
*F21V 21/30*    (2006.01)

(52) U.S. Cl. .................... 362/273; 362/289; 362/428; 362/514

(58) Field of Classification Search .............. 362/270, 362/273, 289, 371, 428, 514, 515, 529–532
See application file for complete search history.

(56) References Cited

U.S. PATENT DOCUMENTS

| | | | | |
|---|---|---|---|---|
| 1,407,544 A | * | 2/1922 | Hunt | ............................ 362/529 |
| 1,712,690 A | * | 5/1929 | Caminetti, Jr. | ............... 362/424 |
| 4,412,275 A | | 10/1983 | McMahan | |
| 4,580,202 A | | 4/1986 | Morette | |
| 4,689,725 A | * | 8/1987 | Saijo et al. | ................... 362/289 |
| 4,870,544 A | * | 9/1989 | Iwamoto | ...................... 362/428 |
| 5,060,127 A | * | 10/1991 | Birt | ............................. 362/515 |
| 5,214,971 A | | 6/1993 | Burton et al. | |
| 5,267,128 A | * | 11/1993 | Shamir et al. | .............. 362/505 |
| 5,526,238 A | | 6/1996 | Van Del et al. | |
| 5,546,283 A | * | 8/1996 | Ohtsuka et al. | .............. 362/289 |
| 5,707,133 A | | 1/1998 | Burton | |
| 5,743,618 A | | 4/1998 | Fujino et al. | |
| 6,017,136 A | | 1/2000 | Burton | |
| 6,113,301 A | | 9/2000 | Burton | |
| 6,244,735 B1 | | 6/2001 | Burton | |
| 6,247,868 B1 | | 6/2001 | Burton | |
| 6,257,747 B1 | | 7/2001 | Burton | |
| 6,481,880 B2 | * | 11/2002 | Mizuno et al. | .............. 362/514 |
| 6,543,916 B2 | * | 4/2003 | Shirai | ......................... 362/530 |
| 6,550,948 B1 | | 4/2003 | Filbrun et al. | |

* cited by examiner

*Primary Examiner*—Alan Cariaso
(74) *Attorney, Agent, or Firm*—Brian G. Gilpin; Godfrey & Kahn, S.C.

(57) ABSTRACT

A lamp assembly that may be used as a fog lamp or headlamp includes a mounting bracket, a reflector, and an adjuster. The reflector is pivotally mounted to the mounting bracket and the adjuster is secured to the reflector. The adjuster is secured to the mounting bracket such that rotation of an aiming screw forming part of the adjuster causes pivoting of the reflector and aiming of the lamp. The adjuster is secured to the bracket prior to the reflector being mounted to the mounting bracket. The bracket and adjuster are provided in pre-assembled fashion.

19 Claims, 22 Drawing Sheets

ADJUSTER AND BRACKET ASSEMBLY

CROSS-REFERENCE TO RELATED APPLICATIONS

This application is a continuation-in-part application of and claims priority benefit of U.S. patent application Ser. No. 10/290,090 filed on Nov. 7, 2002, now U.S. Pat. No. 6,974,231, issued Dec. 13, 2005, which is specifically incorporated herein by reference in its entirety for all purposes.

BACKGROUND OF THE INVENTION

This invention relates generally to adjusters and brackets, and in particular to a combination adjuster and bracket assembly for use in connection with sealed-beam reflector style lamps but is not limited to sealed reflectors.

Sealed-beam style reflector lamp assemblies used as vehicle headlights or fog lights typically comprise several basic parts: a mounting bracket, a sealed-beam lamp (generally including a reflector sealed to a lens with a bulb therein), and at least one adjuster. The mounting bracket is secured to the vehicle and the lamp is pivotably attached thereto so as to allow the aim of the lamp to be adjusted using the adjuster. The mounting bracket and adjuster are typically separately supplied to the manufacturer of the lamp which assembles the components together and provides a completed lamp assembly to the automobile manufacturer.

Conventionally, adjusters are supplied by a subcontractor to the company producing the completed sealed-beam reflector lamp assembly, typically the manufacturer of the lamp. The manufacturer of the lamp attaches the adjuster components to the mounting bracket and to the reflector so as to create a completed lamp assembly. Because of the multiple steps required to assemble the completed lamp assembly using conventional adjusters, the adjusters are supplied to the lamp manufacturer in their component parts which are installed to the lamp and the bracket. Once assembly is completed, the lamp assembly is shipped to the automobile manufacturer for installation to the vehicle. Thus, in order to facilitate assembly of the complete lamp assembly, it is desirable to provide a single pre-assembled bracket and adjuster sub-assembly to the company producing the completed lamp assembly.

Additionally, there are several drawbacks to conventional adjuster and bracket designs used in sealed-beam lamp assemblies. First, the installation of conventional adjusters requires multiple steps at the time of installation to the mounting bracket and lamp including using the adjuster to pre-aim the reflector within the bracket so that little to no adjustment is needed once the lamp assembly is installed into the vehicle. Second, the use of conventional adjusters requires the lamp manufacturer to separately stock the multiple parts required to complete the assembly and installation of the adjuster. Further, the fin that extends from the back side of the reflector to engage the adjuster often requires a hole perpendicular to molding die draw and a thick wall which both adds tooling expense and may create difficulties in the molding of optically correct lamps. Finally, it is costly to produce an adjustment screw that adequately journals into the mounting bracket. Often, this journaling is unsatisfactory.

Accordingly, a need exists for an adjuster and bracket assembly design that is more efficiently assembled by the lamp manufacturer, eliminates pre-aiming of the reflector, reduces tooling expenses and molding difficulties, is provided to the final lamp manufacturer as a single piece, and is cost-effective. The present invention relates to a combination adjuster and bracket for automotive lamps and to solutions to some of the problems raised or not solved by existing adjusters and brackets. Of course, the present invention may be used in connection with fog lamps and regular headlamps and may also have application in a multitude of non-automotive lamp assemblies where similar performance capabilities are required. The present invention may also be used on internally movable reflector lamps (such as the one disclosed in U.S. Pat. No. 6,017,136, the disclosure of which is incorporated herein by reference) by including the bracket features disclosed herein inside the lamp housing and providing access to the adjuster through a covered access port or protruding the aiming screw head through a sealed hole in the housing. Additionally, the invention may be adapted to provide two adjusters on a single bracket so as to allow adjustment in both vertical and horizontal directions.

SUMMARY OF THE INVENTION

The present invention provides an adjuster and bracket assembly that is cost-effective, easily mated to a lamp, and is adaptable for use in connection with various types of lamps. One embodiment of the invention includes a mounting bracket that is mountable to a vehicle. A lamp including a reflector, bulb, and lens is pivotably attached to the mounting bracket using posts molded into the reflector that snap-fit into the mounting bracket. An adjuster is provided between the reflector and the mounting bracket such that rotation of an aiming screw forming part of the adjuster causes pivoting of the reflector. A number of different adjusters and methods for causing the pivoting may be used. The pivoting of the lamp adjusts the aim of the reflector. The bracket may be oriented within the vehicle so as to allow manipulation of the adjuster and adjustment of the aim of the lamp from the rear of the lamp assembly from the top, bottom, or side thereof.

In another embodiment of the present invention, a mounting bracket, lamp, and adjuster are also provided. In this embodiment, the adjuster is oriented so as to allow manipulation of the adjuster and aim of the lamp from the front (or lens side) of the lamp. If desired for aesthetics or aerodynamics, access to the adjuster may be provided through the lens and/or reflector of the lamp.

In another embodiment of the present invention, an adjuster is secured to the mounting bracket to form a unit which receives a reflector. Actuation of the adjuster causes the reflector to pivot with respect to the mounting bracket. The adjuster may be an aiming screw that is functionally engaged to the mounting bracket such that rotation of the aiming screw within the adjuster causes pivoting of the reflector. In one embodiment, the aiming screw is fit into the head retaining bracket portion of the mounting bracket. The aiming screw may have a threaded portion, a head with a driver-receiving recess, and an end. The aiming screw does not have a positioning and/or securement ridge. In one embodiment, a screw boss is threaded onto the aiming screw to form the adjuster. In this embodiment, the screw boss communicates with the reflector. Rotation of the aiming screw causes the screw boss to move along the aiming screw and a resultant pivoting of the reflector. In one embodiment, the screw boss slides along a rail of the mounting bracket. In one embodiment, the mounting bracket has a plurality of arms and the reflector has a plurality of posts. The arms functionally engages the posts such that actuation of the adjuster causes the reflector to pivot on the posts. The posts may snap fit into the arms or insert into the arms.

One embodiment of the adjuster and bracket assembly may be assembled by securing an adjuster to a mounting bracket, pivotally attaching a reflector to the mounting bracket, and functionally engaging the adjuster to the reflector to form a lamp assembly. The lamp assembly may be installed into a vehicle. Once installed, actuating the adjuster pivots the reflector and thus aims the lamp assembly.

One possible application of the present invention is in automotive lamp assemblies, in particular headlamps and fog lamps, but many other applications are possible and references to use in an automotive headlamp assembly should not be deemed to limit the uses of the present invention. While certain embodiments are discussed herein, they should not be interpreted as being the only embodiments of the present invention and other embodiments, such as the use of two adjusters to allow dual-axis pivoting, may be created without departing from the present invention. These and other objects and advantages of the present invention will become apparent from the detailed description, claims, and accompanying drawings.

DETAILED DESCRIPTION OF THE PREFERRED EMBODIMENTS

Figure 1:
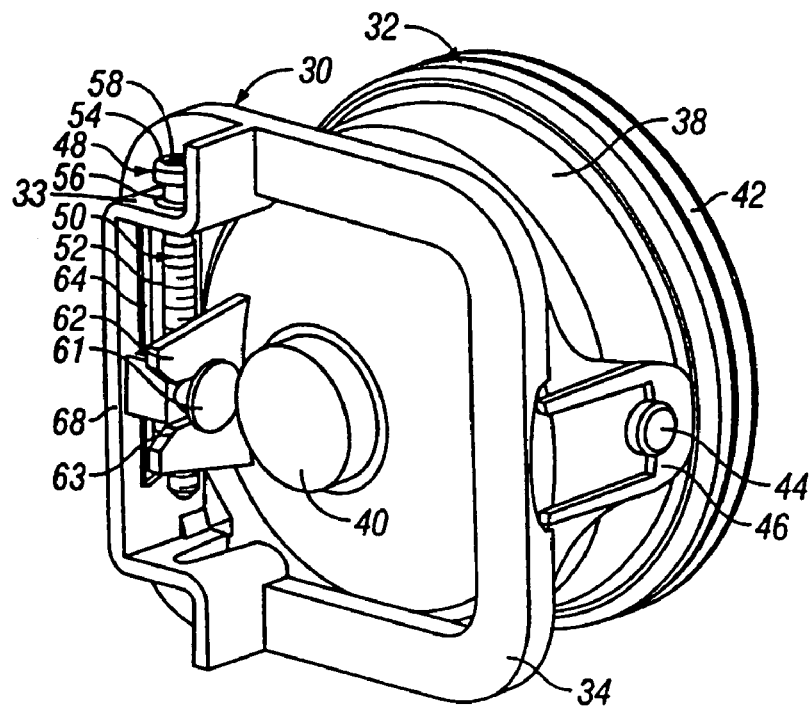
FIG. 1 is a rear perspective view of a mounting bracket, lamp, and adjuster in accordance with one embodiment of the assembly.
Figure 2:
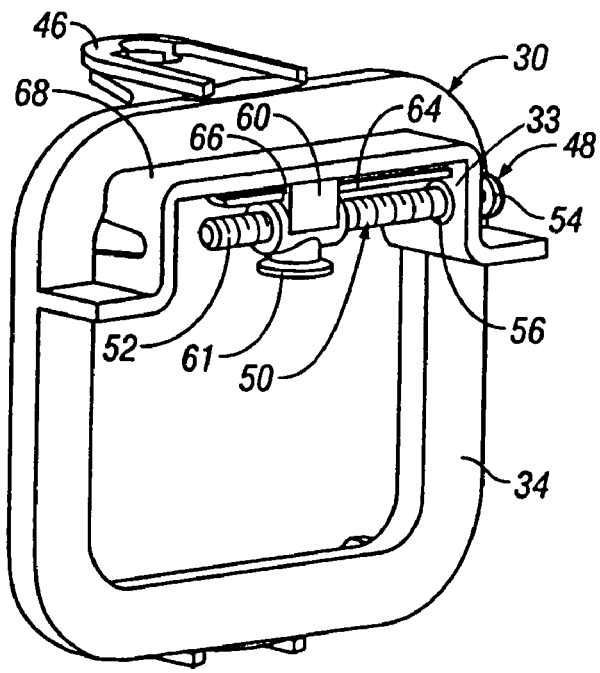
FIG. 2 is a rear perspective view of the assembly of FIG. 1, shown without the lamp.
Figure 4:
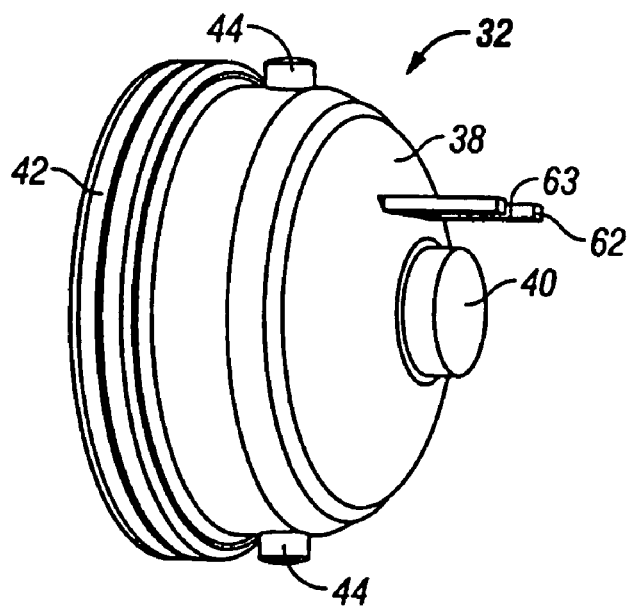
FIG. 4 is a rear perspective view of the lamp of FIG. 1.
Figure 7:
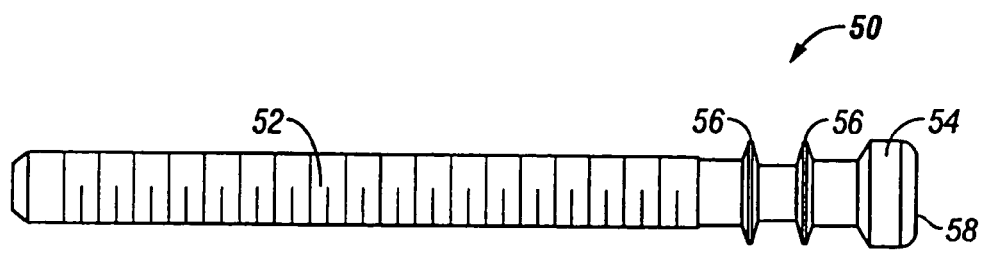
FIG. 7 is a detailed perspective view of the aiming screw portion of the adjuster shown in FIG. 1.

FIG. 1 shows one embodiment of an adjuster and bracket assembly (identified generally as 30) in accordance with one embodiment of the present invention, shown attached to a lamp 32. The adjuster and bracket assembly 30 includes a mounting bracket 34 that may be mounted to a vehicle (not shown) using threaded mounting studs 36 (see, e.g., FIG. 8) or other means known in the industry. The lamp 32 (shown independently in FIG. 4) including a reflector 38, bulb 40 (rear of which shown), and lens 42 is pivotably attached to the mounting bracket 34 using posts 44 molded into the reflector 38 that snap-fit into arms 46 extending from the mounting bracket 34. The lamp 32 is free to pivot about an axis between the posts 44. An adjuster (identified generally as 48) is provided between the lamp 32 and the mounting bracket 34 such that rotation of an aiming screw 50 (shown independently in FIG. 7) forming part of the adjuster 48 causes pivoting of the lamp 32. The pivoting of the lamp 32 adjusts the aim of the lamp 32.

As shown in FIG. 1, and in more detail in FIGS. 2, 3, 6, and 7, the adjuster 48 includes a number of parts. The adjuster 48 includes an aiming screw 50 that has a threaded portion 52, a head 54, and at least one positioning and securement ridge 56. The embodiment of the aiming screw 50 shown in FIGS. 1-3, and 7 has two positioning and securement ridges 56. The positioning and securement ridges 56 help journal the aiming screw 50 within the mounting bracket 34. As discussed more thoroughly below, the head 54 can be used to help journal the aiming screw 50 in the receiver 33 of the mounting bracket 34 and other alternative designs that help journal the aiming screw 50 within the mounting bracket 34 are possible without departing from the invention. The head 54 of the aiming screw 50 has a driver-receiving recess 58 that can be adapted to accommodate a variety of drivers (a phillips-head driver-receiving recess 58 is shown). The threaded portion 52 of the aiming screw 50 is extended along at least a portion of the length of the aiming screw 50. The threaded portion 52 is threaded into a screw boss 60 (shown in detail in FIG. 6) that has a tab 61 engaged with a V-shaped slot 63 in a fin 62 extending from the reflector 38 of the lamp 32. Because the screw boss 60 is threaded to the threaded portion 52 of the aiming screw 50, rotation of the aiming screw 50 causes movement of the screw boss 60 along the axis of the aiming screw 50, corresponding movement of the reflector 38, and pivoting and aiming of the lamp 32. In order to allow for the change in angular orientation of the aiming screw 50 with respect to the lamp 32 when aim adjustment occurs, the screw boss 60 is in pivotable engagement with the fin 61 of the reflector 38 of the lamp 32.

Figure 5:
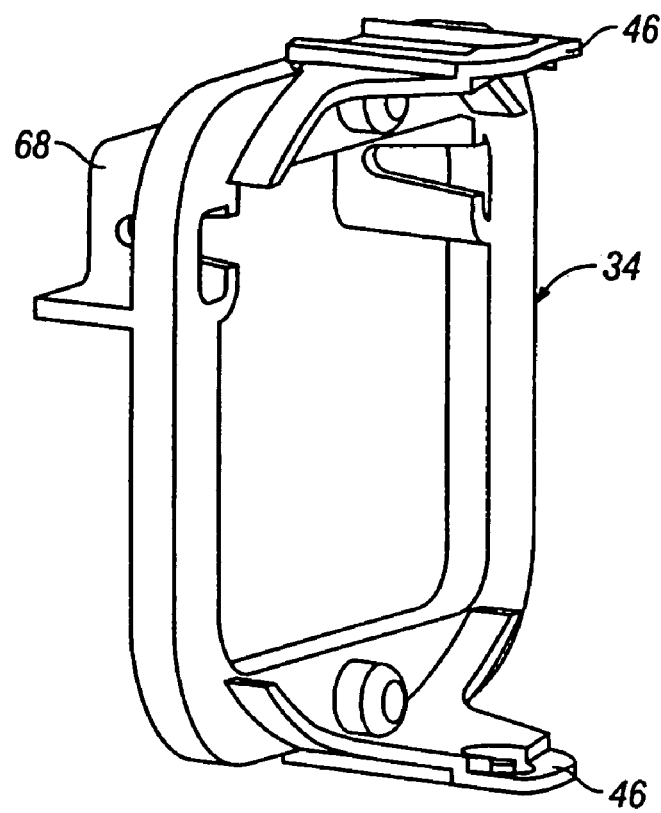
FIG. 5 is a front perspective view of the mounting bracket of FIG. 1.

The mounting bracket 34 (shown independently in FIG. 5) may be formed in a variety of shapes such that it is capable of acting as an effective platform for mounting the lamp 32 and adjuster 48. In the embodiment shown in FIG. 1, the mounting bracket 34 has a generally square shape with two arms 46 extending therefrom to engage the posts 44 of the reflector 38. Of course, other shapes could be used for the mounting bracket 34. In this embodiment, the mounting bracket 34 further includes a T-shaped rail 64 on which the screw boss 60 rides to, along with the journaling provided by the positioning and securement ridges 56, maintain the positioning of the aiming screw 50. Alternatively, as shown in FIG. 6B, the mounting bracket 34 can include an L-shaped rail 65. The mounting bracket 34 further includes an adjuster bracket 68, which positions the adjuster 48 within the mounting bracket 34.

Figure 3:
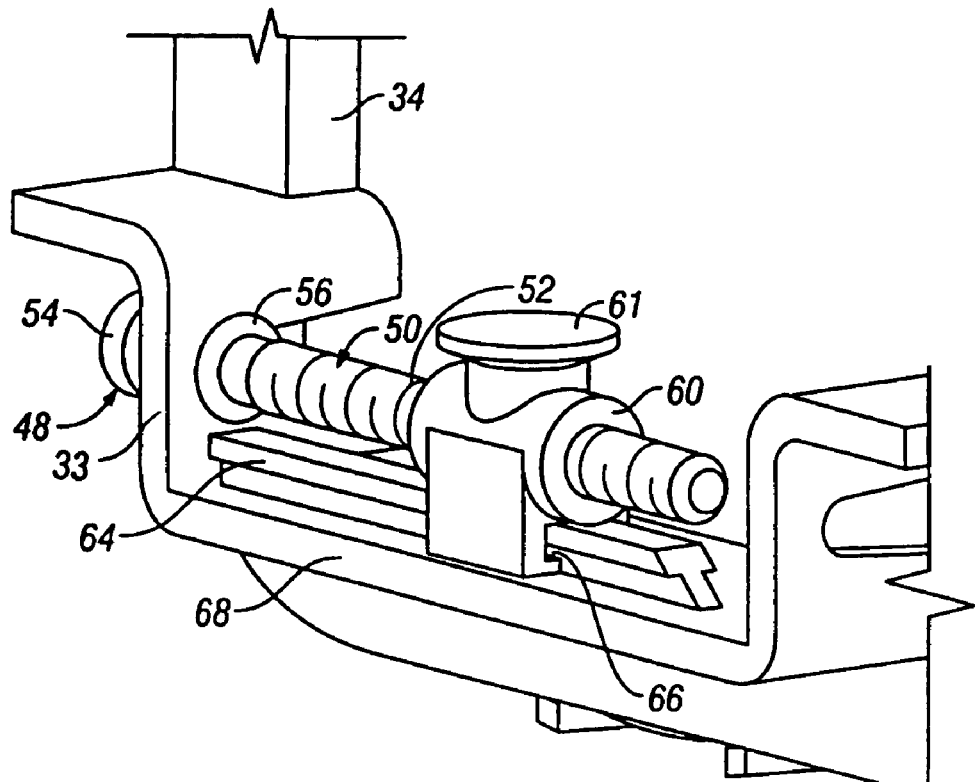
FIG. 3 is a detail perspective view of the assembly shown in FIG. 2, showing the adjuster attached to the mounting bracket.
Figure 6:
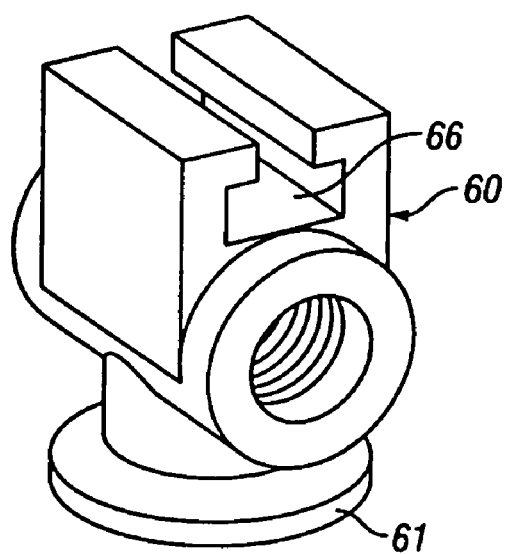
FIG. 6 is detailed perspective view of the screw grommet portion of the adjuster shown in FIG. 1.
Figure 6A:
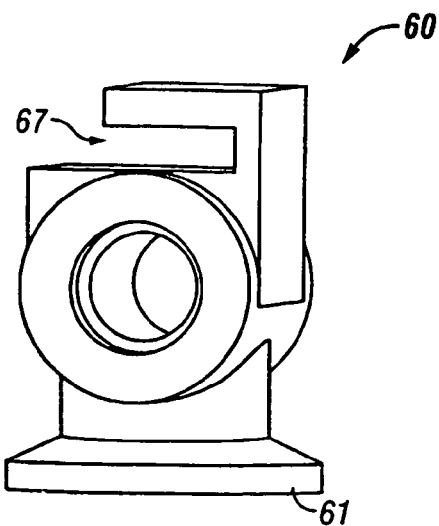
FIG. 6A is a detail perspective view of one alternative embodiment of the screw grommet portion of the adjuster.
Figure 6B:
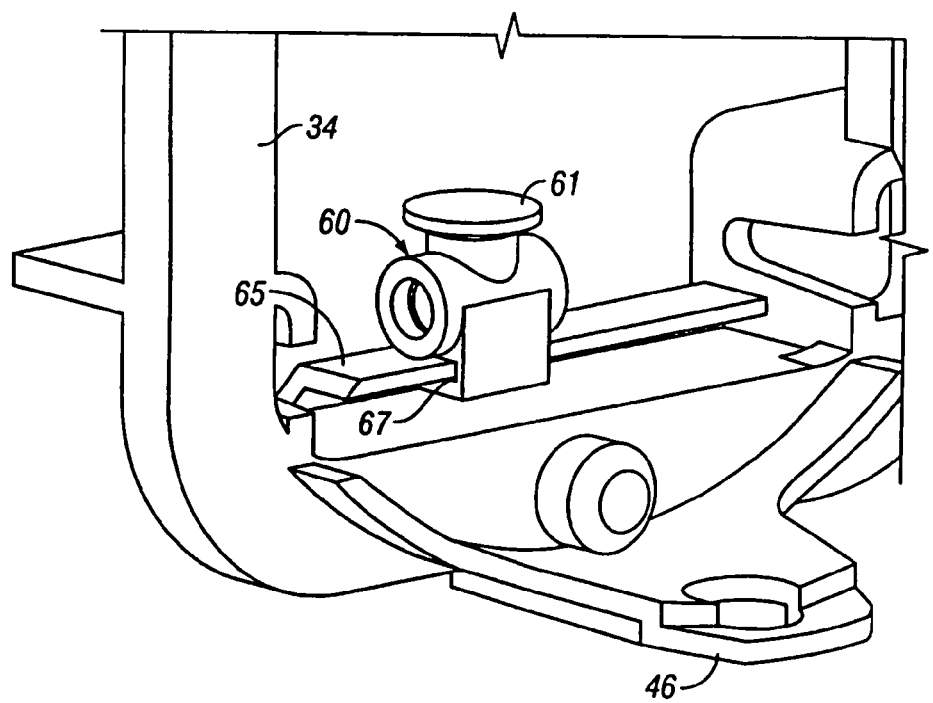
FIG. 6B is a detail perspective view of the screw grommet of FIG. 6, shown mounted to a correspondingly shaped rail.

As shown in detail in FIGS. 3 and 6, the screw boss 60 has a T-shaped slide 66 in which the T-shaped rail 64 of the mounting bracket 34 is engaged. Of course, other configurations could be used for the screw boss 60, T-shaped slide 66, and T-shaped rail 64 without departing from the invention. One alternative configuration is the L-shaped rail 65 and L-shaped slide 67 shown in FIGS. 6A and 6B.

The adjuster and bracket assembly 30 may be oriented within the vehicle so as to allow manipulation of the adjuster 48 and adjustment of the aim of the lamp 32 from the rear of the adjuster and bracket assembly 30 from the top, bottom, or side thereof. The embodiment shown in FIG. 1 reflects an orientation of the adjuster and bracket assembly 30 such that the aim of the lamp 32 may be accomplished from the top thereof.

In assembling the adjuster and bracket assembly 30 reflected in FIGS. 1-7, the positioning and securement ridge 56 of the aiming screw 50 is first fit into a slot 74 the adjuster bracket 68 portion of the mounting bracket 34 that allows the aiming screw 50 to rotate put prevents axial movement. The screw boss 60 then slides over a guide rail, such as the T-shaped rail 64 or the L-shaped rail 65, until it reaches the threaded portion 52 of the aiming screw 50. The aiming screw 50 is then rotated until the screw boss 60 is engaged thereon and positioned for mating to the reflector 38 such that the lamp 32 will be properly aimed when assembled. If an L-shaped slide 67 is used in the screw boss 60 and an L-shaped rail 65 is provided on the mounting bracket 34, the screw boss 60 can first be threaded to the aiming screw 50 before connection to the mounting bracket 34. In this assembly sequence, the assembled aiming screw 50 and screw boss 60 combination are then installed to the mounting bracket 34 prior to attaching the lamp 32. The completed adjuster and bracket assembly 30 is then ready for the attachment of the reflector 38. The installer of the reflector 38 snap-fits the posts 44 extending from the reflector 38 into the arms 46 extending from the mounting bracket 34, thereby simultaneously mating the U-shaped slot 63 in the fin 62 extending from the reflector 38 with the tab 61 extending from the screw boss 60. Once the reflector 38 is installed, both the aiming screw 50 and the screw boss 60 are fully captioned within the mounting bracket 34. The lamp assembly is then complete, pre-aimed, and ready to be installed to a vehicle.

Figure 8:
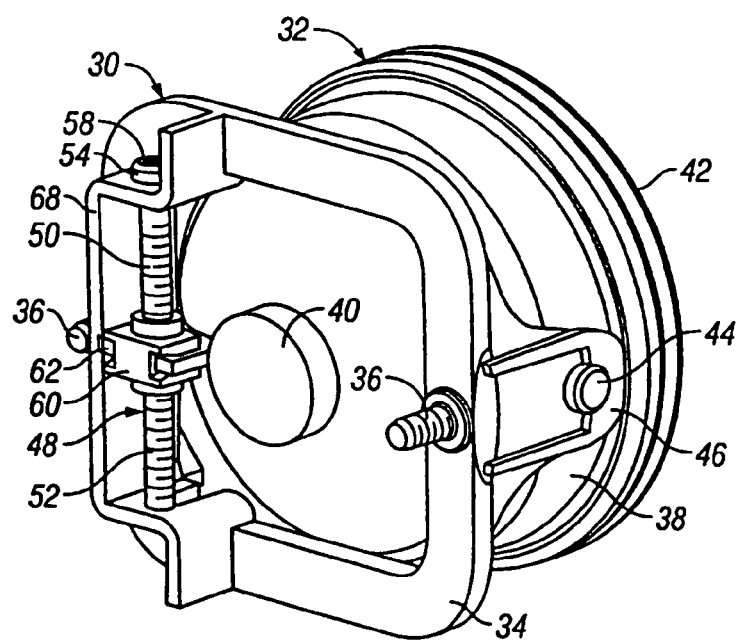
FIG. 8 is a rear perspective view of a mounting bracket, lamp, and adjuster in accordance with another embodiment of the assembly.
Figure 9:
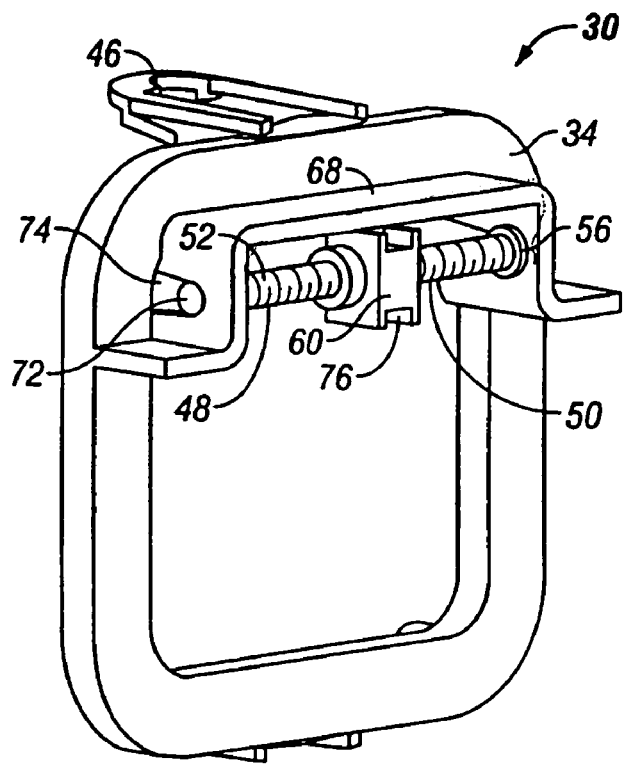
FIG. 9 is a rear perspective view of the assembly of FIG. 8, shown without the lamp.
Figure 10:
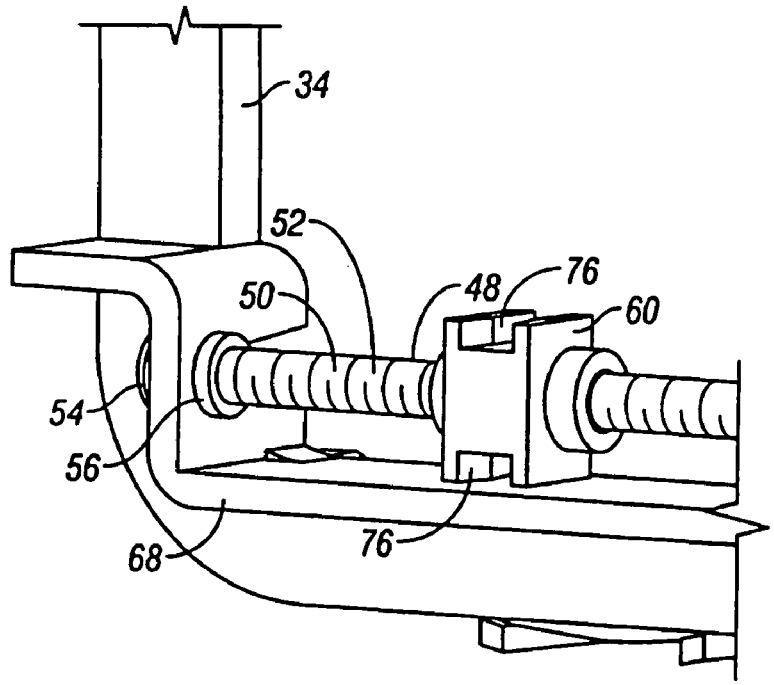
FIG. 10 is a detail perspective view of the assembly shown in FIG. 9, showing the adjuster attached to the mounting bracket
Figure 11:
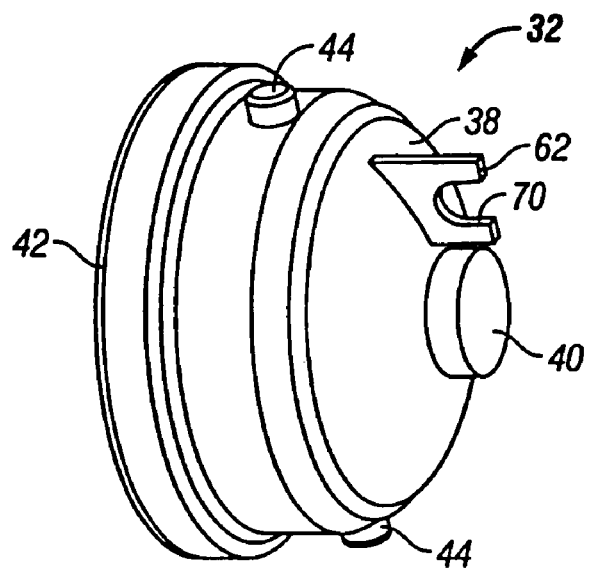
FIG. 11 is a rear perspective view of the lamp of FIG. 8.
Figure 12:
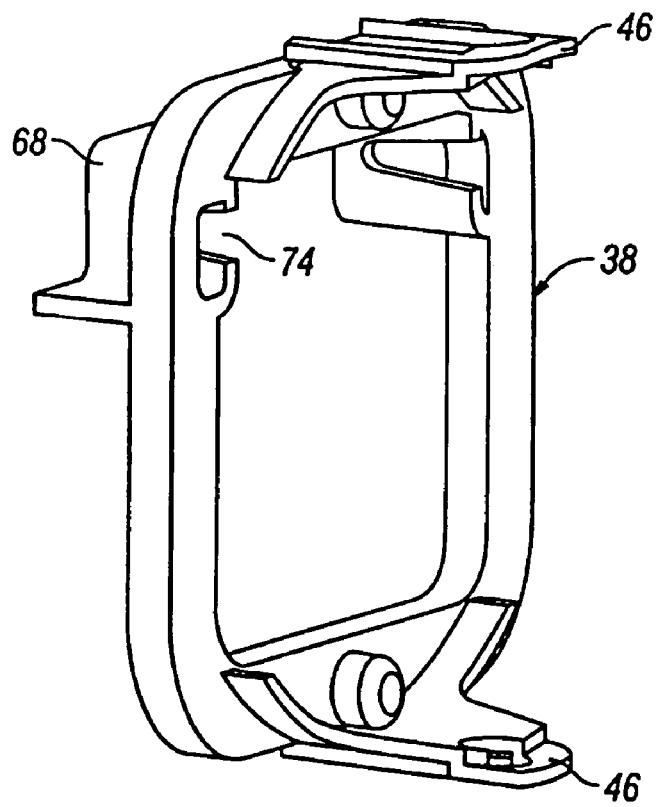
FIG. 12 is a front perspective view of the mounting bracket of FIG. 8.
Figure 13:
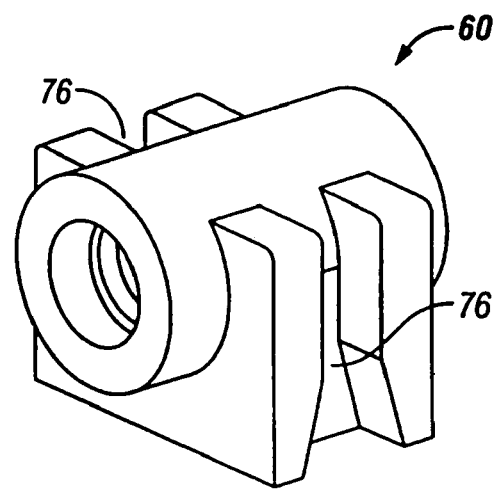
FIG. 13 is a detailed perspective view of the screw grommet portion of the adjuster shown in FIG. 8.
Figure 14:
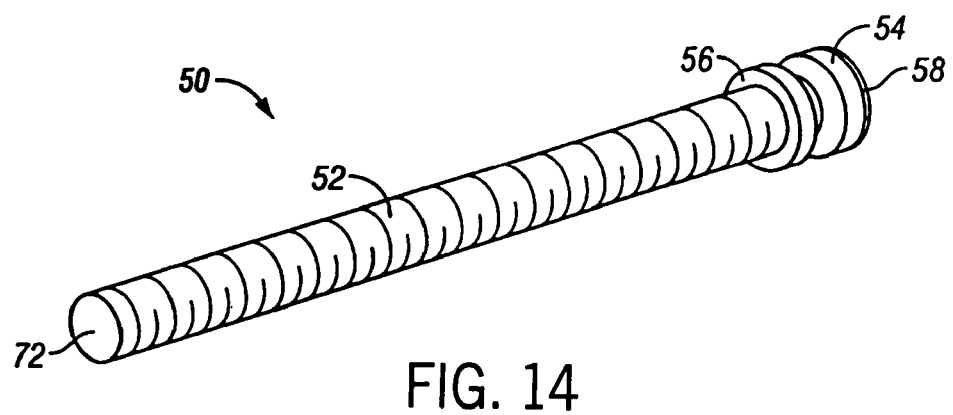
FIG. 14 is a detailed perspective view of the aiming screw portion of the adjuster shown in FIG. 8.

Another embodiment of the present invention is shown in FIGS. 8-14. This embodiment has a configuration somewhat similar to that of the embodiment shown in FIGS. 1-7 and the primary differences between the embodiments are described below. Of course, features used in each embodiment could be configured to be used in connection with the other embodiment. As shown in FIGS. 8 and 9, in this embodiment, the mounting bracket 34 also includes an adjuster bracket 68 used to position the adjuster 48. However, in this embodiment, the screw boss 60 does not include a T-shaped slide 66 or an L-shaped slide 67 (see FIGS. 10 and 13) and the mounting bracket 34 does not include a T-shaped rail 64 or an L-shaped rail 65 (see FIGS. 8 and 10). Rather, as best seen in FIGS. 9 and 10, in this embodiment, the aiming screw 50 is journaled on both ends within the adjuster bracket 68. The head 54 of the aiming screw 50 and a positioning and securement ridge 56 in combination journal the head 54 of the aiming screw 50 within the adjuster bracket 68 of the mounting bracket 34 and the end 72 of the aiming screw 50 is journaled in a slot or hole 74 in the adjuster bracket 68. As best seen in FIGS. 8, 9, 11, and 13, rather than using the tab 61 from the previously described embodiment, the screw boss 60 used in this embodiment includes engagement channels 76 with which a U-shaped slot 70 in the fin 62 is engaged. This embodiment is operated in the same fashion as the previously described embodiment in that because the screw boss 60 is threaded to the threaded portion 52 of the aiming screw 50, rotation of the aiming screw 50 causes movement of the screw boss 60 along the axis of the aiming screw 50, corresponding movement of the reflector 38, and pivoting and aiming of the lamp 32. In order to allow for the change in angular orientation of the aiming screw 50 with respect to the reflector 38 when aim adjustment occurs, the screw boss 60 is in pivotable engagement with the fin 62 of the reflector 38 of the lamp 32.

In assembling the embodiment of the adjuster and bracket assembly 30 reflected in FIGS. 8-14, the aiming screw 50 is rotated until the screw boss 60 is threaded thereon and positioned for mating to the reflector 38 after the adjuster 48 has been attached to the mounting bracket 34. The aiming screw 50 is then snap-fit into the adjuster bracket 68 portion of the mounting bracket 34 such that the end 72 of the aiming screw 50 is positioned in the slot 74 in the adjuster bracket and the head 54 and the positioning and securement ridge 56 journal the aiming screw 50 in the adjuster bracket 68. The completed adjuster and bracket assembly 30 is then ready for the attachment of the reflector 38. The installer of the reflector 38 snap-fits the posts 44 extending from the reflector 38 into the arms 46 extending from the mounting bracket 34, thereby simultaneously mating the U-shaped slot 70 in the fin 62 extending from the reflector 38 with the engagement channels 76 of the screw boss 60. The lamp assembly is then complete and ready to be installed to a vehicle.

Figure 15:
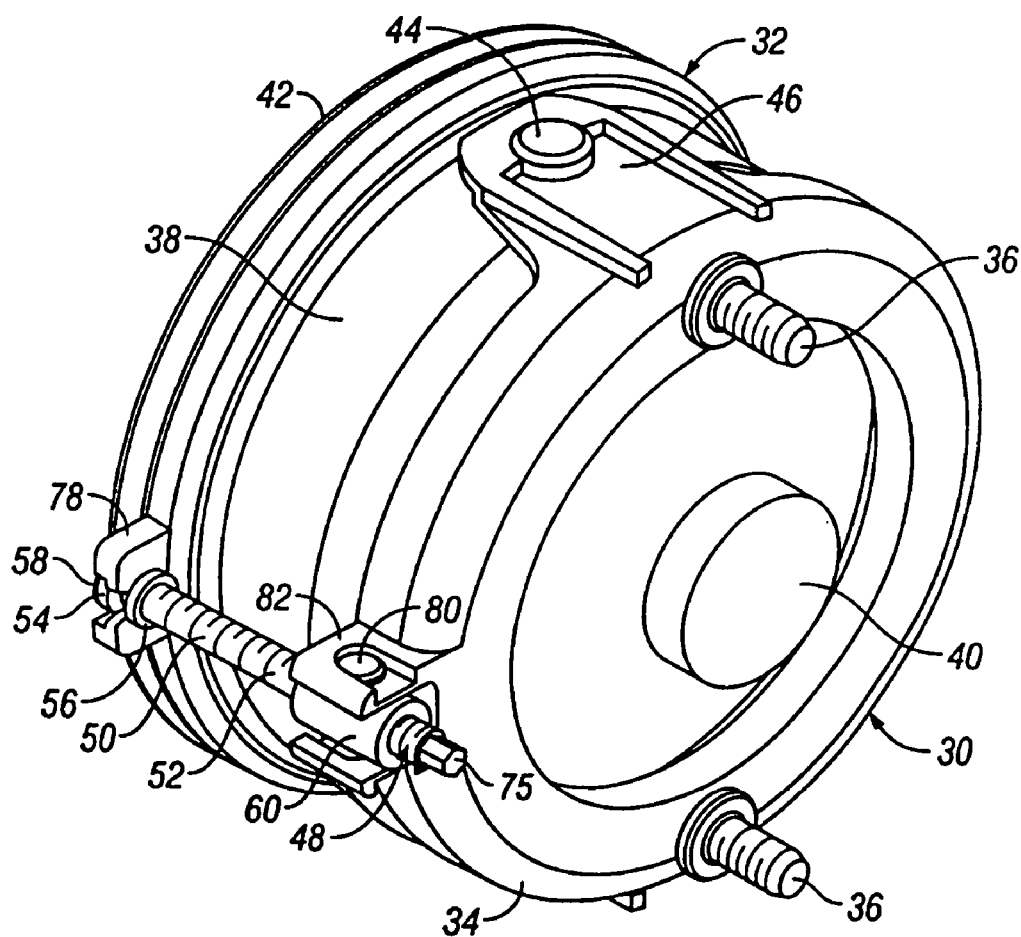
FIG. 15 is a rear perspective view of a mounting bracket, lamp, and adjuster in accordance with another embodiment of the assembly.
Figure 16:
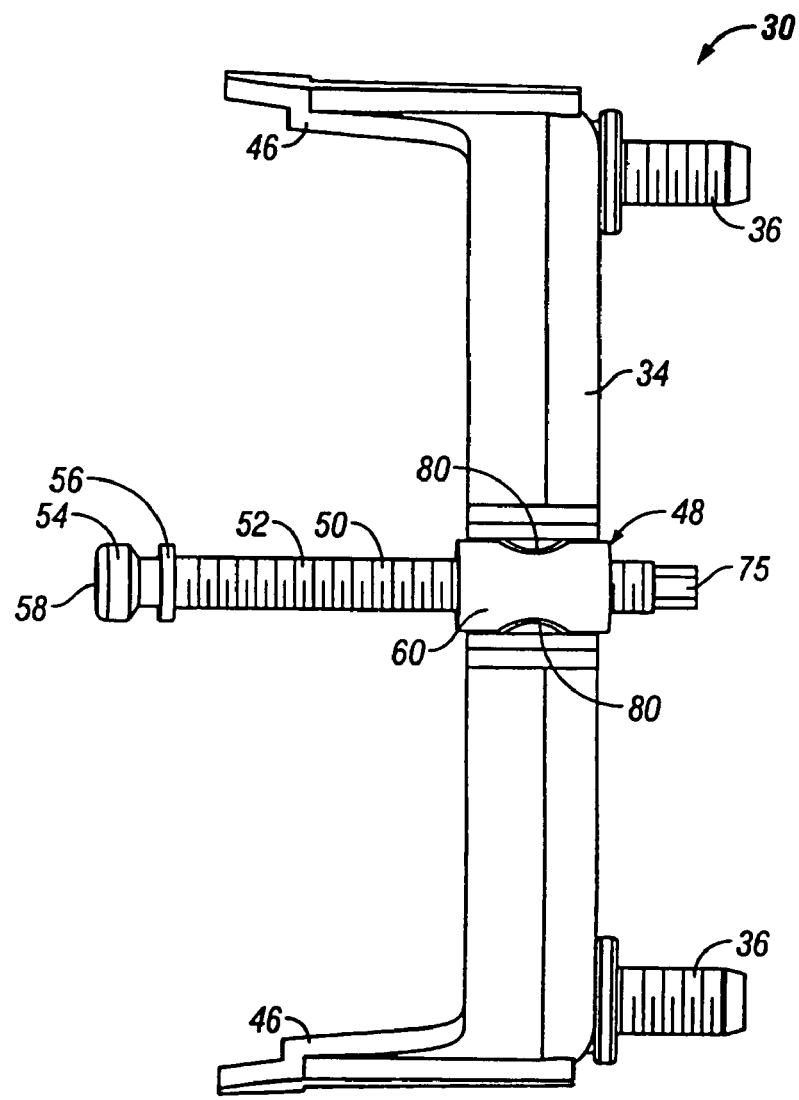
FIG. 16 is a side elevation of the assembly of FIG. 15, shown without the lamp.
Figure 17:
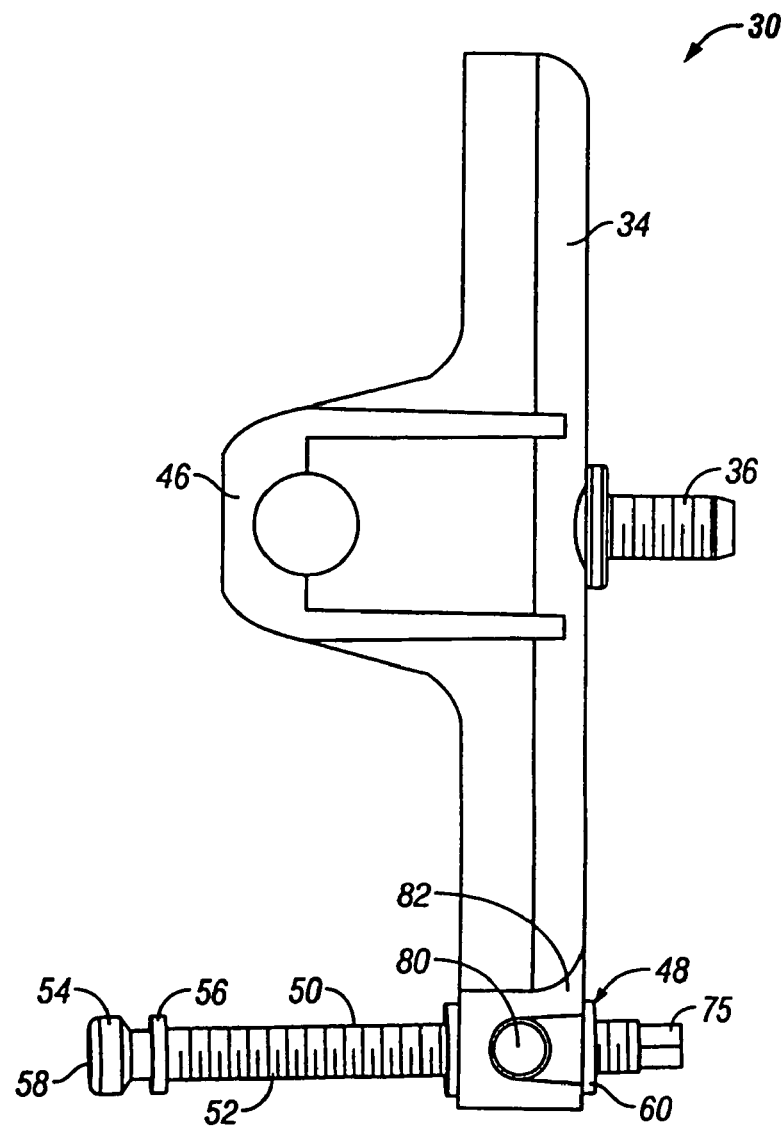
FIG. 17 is a top plan view of the assembly of FIG. 15, shown without the lamp.
Figure 18:
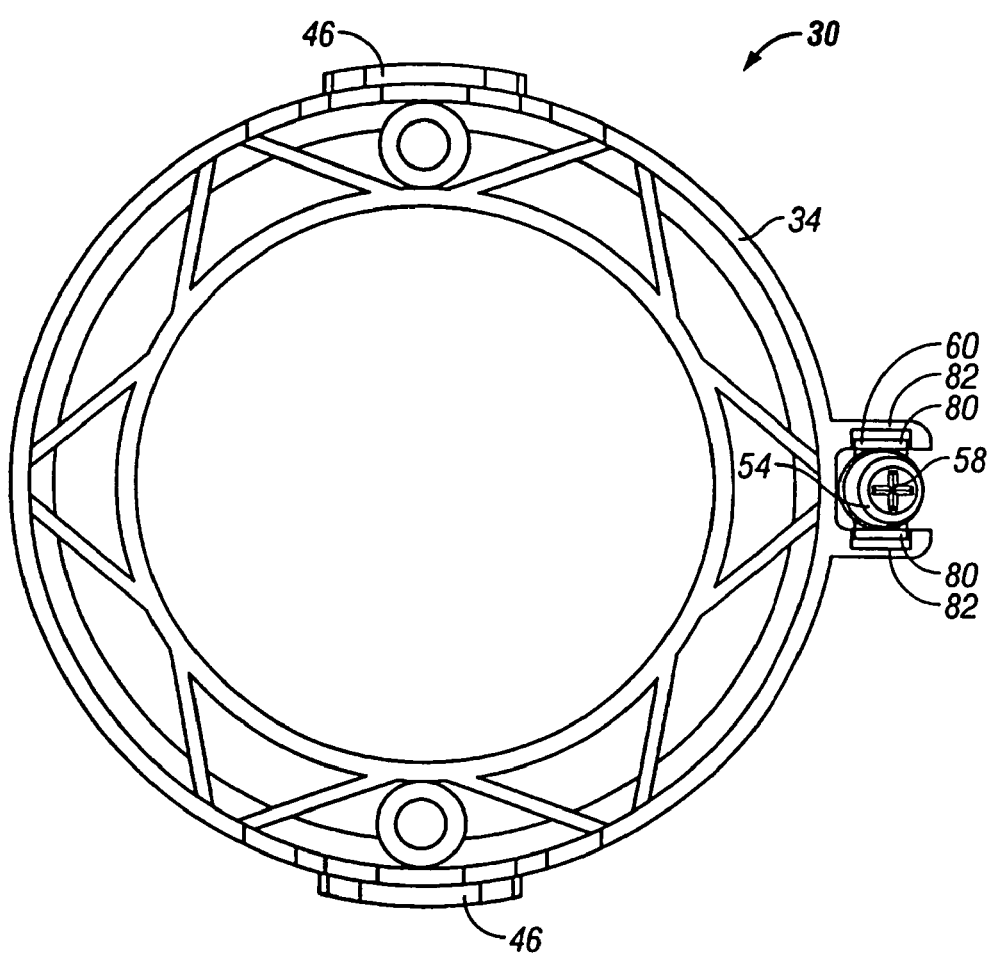
FIG. 18 is a front elevation of the assembly of FIG. 15, shown without the lamp.
Figure 19:
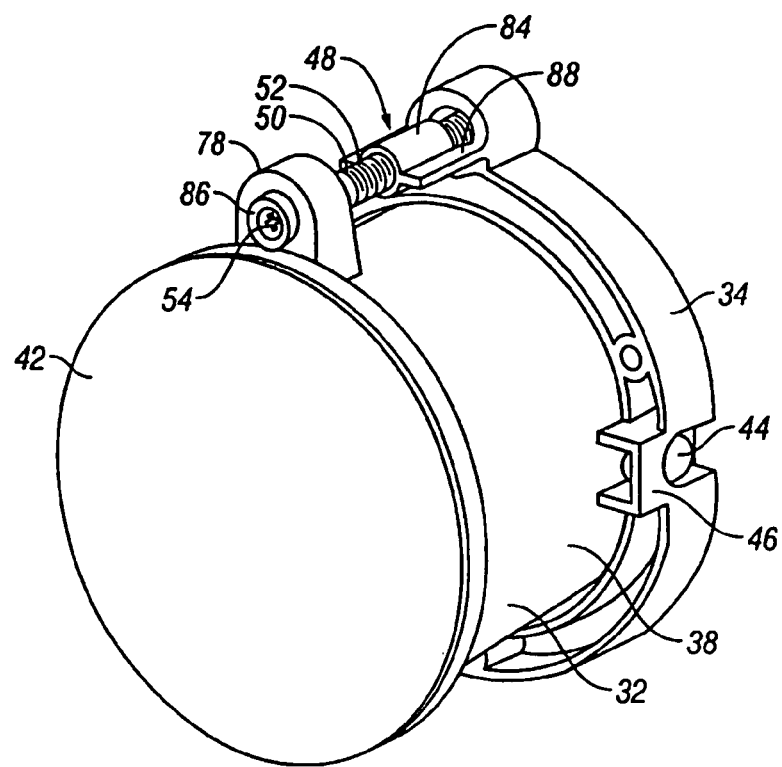
FIG. 19 is a front perspective view of a mounting bracket, lamp, and adjuster in accordance with another embodiment of the assembly.
Figure 20:
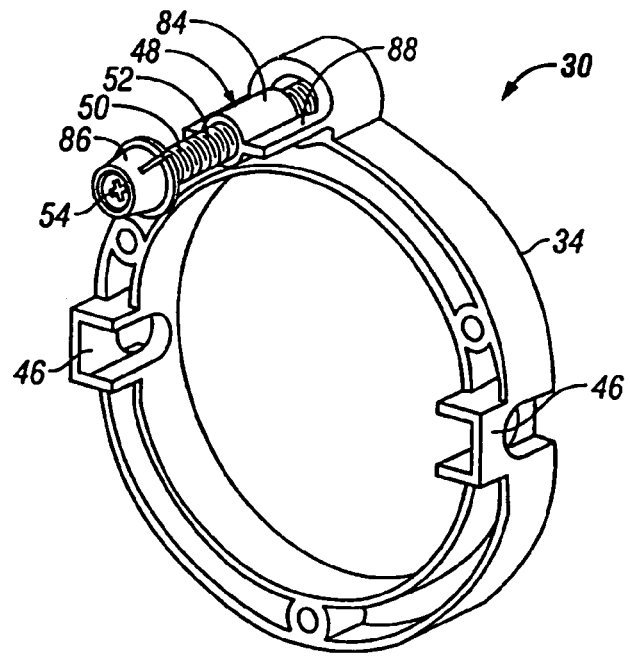
FIG. 20 is a front perspective view of the assembly of FIG. 19, shown without the lamp.

In another embodiment of the invention, shown in FIGS. 15-18, a mounting bracket 34, lamp 32, and adjuster 48 are also provided. In this embodiment, the adjuster 48 is oriented so as to allow manipulation of the adjuster 48 and aim of the lamp 32 from the front (or lens 42 side) of the lamp 32 or from the rear using the drive 75 at the opposite end of the aiming screw 50. In this embodiment, the adjuster and bracket assembly 30 includes a mounting bracket 34 that may be mounted to a vehicle using threaded mounting studs 36 or other means known in the industry. The lamp 32 including reflector 38, bulb 40, and lens 42, is pivotably attached to the mounting bracket 34 using posts 44 molded into the reflector 38 that snap-fit into arms 46 extending from the mounting bracket 34. As in the previously described embodiments, an adjuster 48 is provided between the mounting bracket 34 and the reflector 38. However, in this embodiment, the head 54 of the adjuster 48 is journaled by the reflector 38 of the lamp 32 and the screw boss 60 is pivotably secured to the mounting bracket 34. As shown in FIG. 15, the head 54 of the adjuster 48 is snap-fit into a head-retaining brace 78 in the reflector 38. Alternatively, the head 54 of the adjuster 48 may be secured to the reflector 38 or the lens 42 as described below with respect to the embodiments shown in FIGS. 19-22. The screw boss 60 has mounting tabs 80 that are snap-fit into a mount 82 extending from the mounting bracket 34 so as to allow the screw boss 60 to pivot within the mount 82. The aiming screw 50 of the adjuster 48 is threaded into the screw boss 60 such that rotation of the aiming screw 50 causes movement of the screw boss 60 along the axis of the aiming screw 50. As the screw boss 60 is retained in the mounting bracket 34, such axial movement causes pivoting of the reflector 38 and adjustment of the aim of the lamp 32. In order to allow for the change in angular orientation of the aiming screw 50 with respect to the mounting bracket 34 when aim adjustment occurs, the screw boss 60 is pivotable with respect to the mounting bracket 34.

In assembling the embodiment of the adjuster and bracket assembly 30 reflected in FIGS. 15-18, the aiming screw 50 is rotated until the screw boss 60 is threaded thereon and positioned for mating to the mounting bracket 34. The mounting tabs 80 of the screw boss 60 are then snap-fit into the mount 82 extending from the mounting bracket. The completed adjuster and bracket assembly 30 is then ready for the attachment of the lamp 32. The installer of the lamp 32 snap-fits the posts 44 extending from the reflector 38 into the arms 46 extending from the mounting bracket 34, and then the head 54 of the adjuster 48 is snap-fit into a head-retaining brace 78 in the reflector 38 of the lamp 32. (If the head 54 of the adjuster 48 is secured to the reflector 38 or the lens 42 as described below with respect to the embodiments shown in FIGS. 19-22, the connection between the head 54 and the reflector 38 or lens 42 is made simultaneously with the mating of the reflector 38 to the mounting bracket 34.) The lamp assembly is then complete and ready to be installed to a vehicle.

Figure 21:
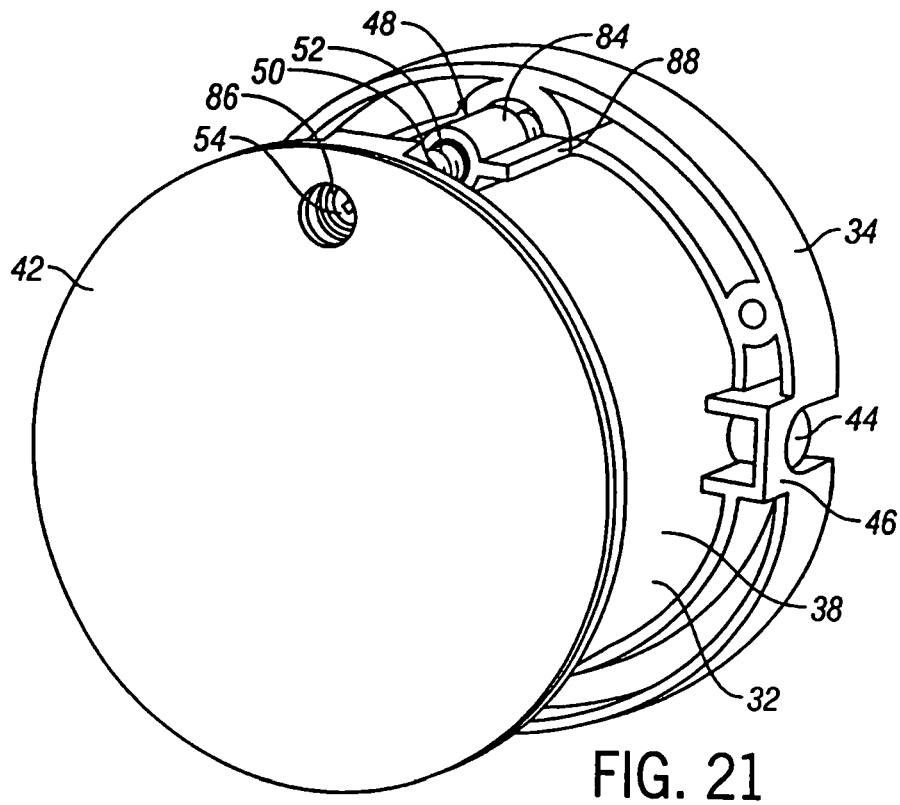
FIG. 21 is a front perspective view of a mounting bracket, lamp, and adjuster in accordance with another embodiment of the assembly.
Figure 22:
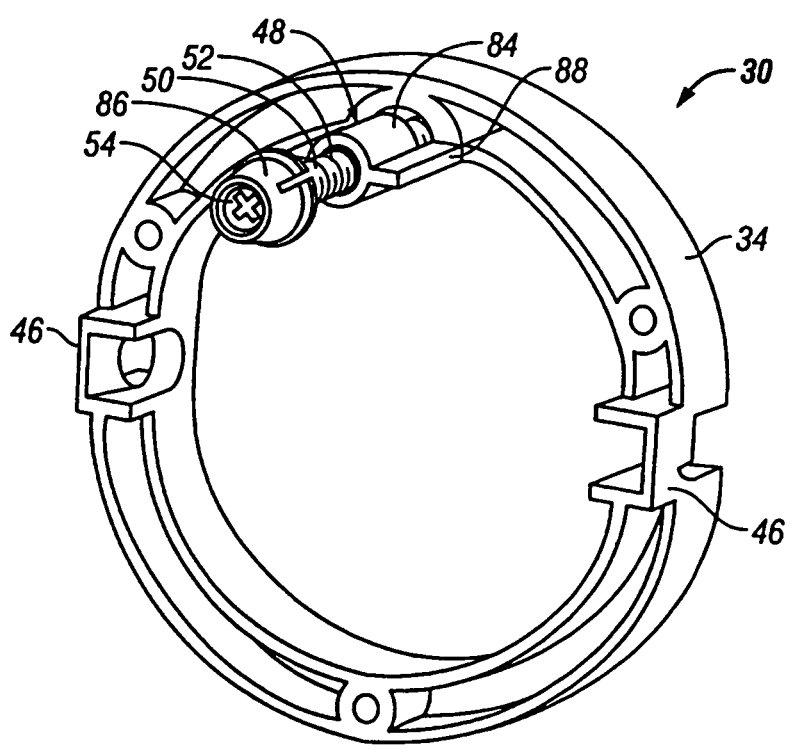
FIG. 22 is a front perspective view of the assembly of FIG. 21, shown without the lamp.
Figure 23:
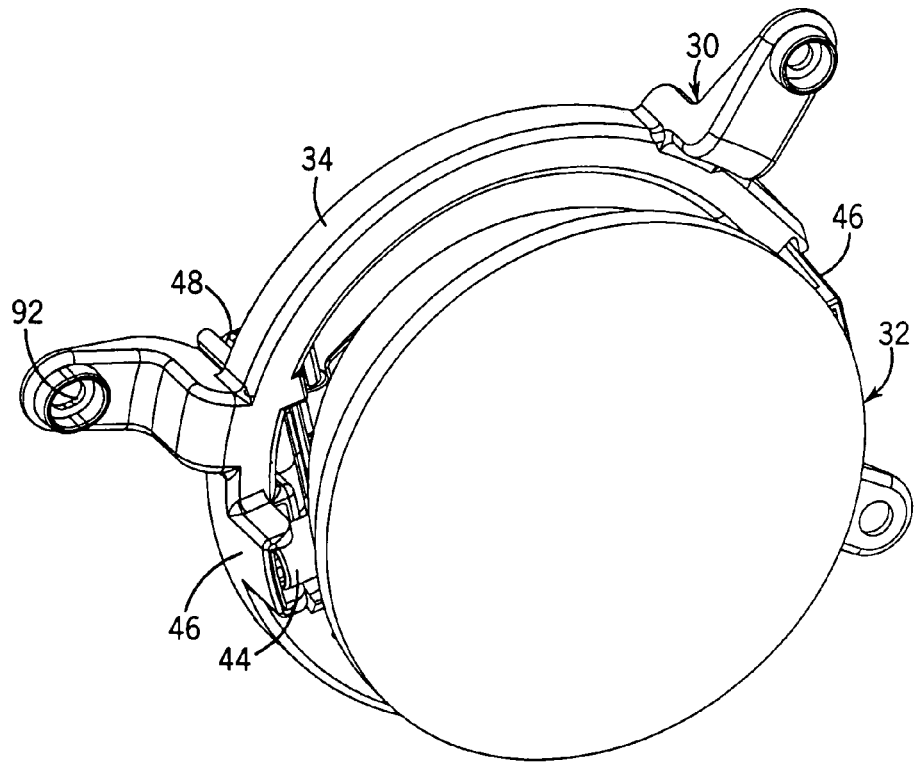
FIG. 23 is a front perspective view of a mounting bracket, lamp, and adjuster in accordance with another embodiment of the assembly.

In additional embodiments of the invention, shown in FIGS. 19-22, a mounting bracket 34, lamp 32, and adjuster 48 are also provided. In this embodiment, the adjuster 48 is oriented so as to allow manipulation of the adjuster 48 and aim of the lamp 32 from the front (or lens 42 side) of the lamp 32. In this embodiment, the adjuster and bracket assembly 30 includes a mounting bracket 34 that may be mounted to a vehicle using threaded mounting studs 36 (not shown, see FIG. 8) or other means known in the industry. The lamp 32 including reflector 38, bulb 40 (not shown), and lens 42, is pivotably attached to the mounting bracket 34 using posts 44 molded into the reflector 38 that snap-fit into arms 46 extending from the mounting bracket 34. As in the previously described embodiments, an adjuster 48 is provided between the mounting bracket 34 and the lamp 32. In this embodiment, as in the embodiment shown in FIGS. 15-18, the head 54 of the adjuster 48 is journaled by the reflector 38 (FIGS. 19 and 20) or the lens 42 (FIGS. 21 and 22) of the lamp 32. This journaling is accomplished using a pivot cap 86 placed over the head 54 of the aiming screw 50 that snap-fits into the head-retaining brace 78 that extends from the reflector 38 (FIG. 19) or snap-fits into the backside of the lens 42 (FIG. 21). However, in this embodiment, rather than using a screw boss 60, an internally threaded arm 84 that extends from the mounting bracket 34 is provided. The threaded portion 52 of the aiming screw 50 is threaded into the arm 84 forming internal threads therein (or the arm 84 may be pre-threaded) such that rotation of the aiming screw 50 causes axial movement of the aiming screw 50 with respect to the internally threaded arm 84. As the head 54 of the aiming screw 50 is retained in the reflector 38 or lens 42, such axial movement causes pivoting and adjustment of the lamp 32. In order to allow for the change in angular orientation of the aiming screw 50 with respect to the mounting bracket 34 when aim adjustment occurs, the arm 84 extends from the mounting bracket 34 using one or more flexible struts 88.

In assembling the embodiment of the adjuster and bracket assembly 30 reflected in FIGS. 19-22, the aiming screw 50 is threaded into the internally threaded arm 84 extending from the mounting bracket until the head 54 of the adjuster 48 is positioned for mating to the frame 38 or lens 42 of the lamp 32. The completed adjuster and bracket assembly 30 is then ready for the attachment of the lamp 32. The installer of the lamp 32 snap-fits the posts 44 extending from the reflector 38 into the arms 46 extending from the mounting bracket 34, simultaneously snap-fitting the pivot cap 86 over the head 54 of the aiming screw 50 into the head-retaining brace 78 or into the backside of the lens 42. The lamp assembly is then complete and ready to be installed to a vehicle.

In another embodiment of the invention, shown in FIGS. 23-35, a mounting bracket 34, lamp 32, and adjuster 48 are also provided. This embodiment has a configuration somewhat similar to that of the embodiments shown in FIGS. 1-7 and 8-14 and the primary differences between the embodiments are described below. Of course, features used in each embodiment could be configured to be used in connection with the other embodiments. In this embodiment, the adjuster and bracket assembly 30 includes a mounting bracket 34 that may be mounted to a vehicle by fasteners. Fasteners may be inserted through mounting holes 92 in the mounting bracket 34 and into mated orifices in the vehicle. Alternatively, the mounting bracket 34 may be mounted to a vehicle using threaded mounting studs or other means known in the industry.

Figure 24:
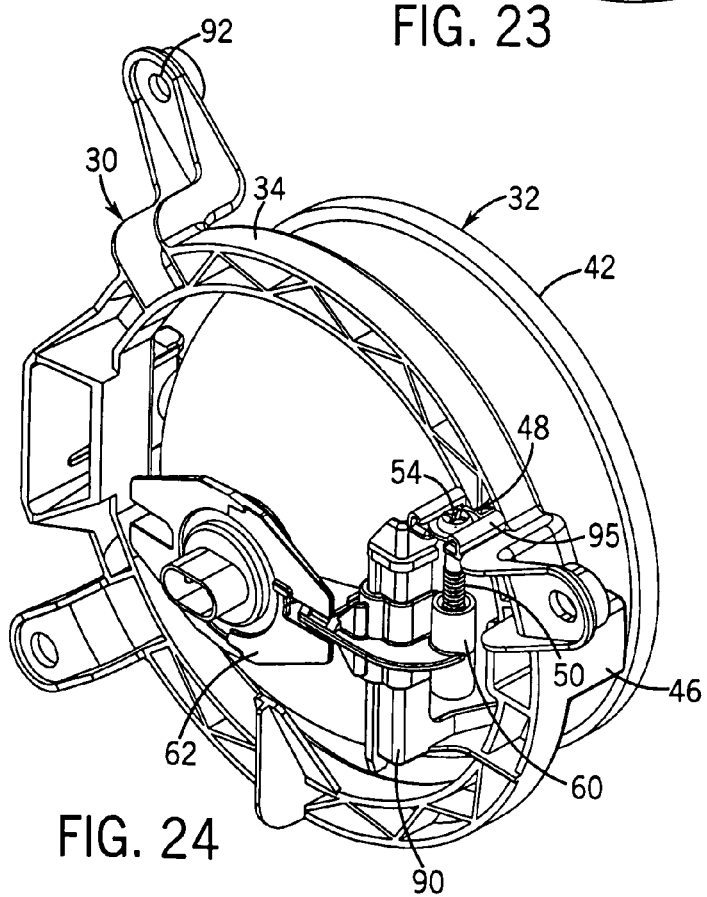
FIG. 24 is a rear perspective view of the assembly of FIG. 23.
Figure 25:
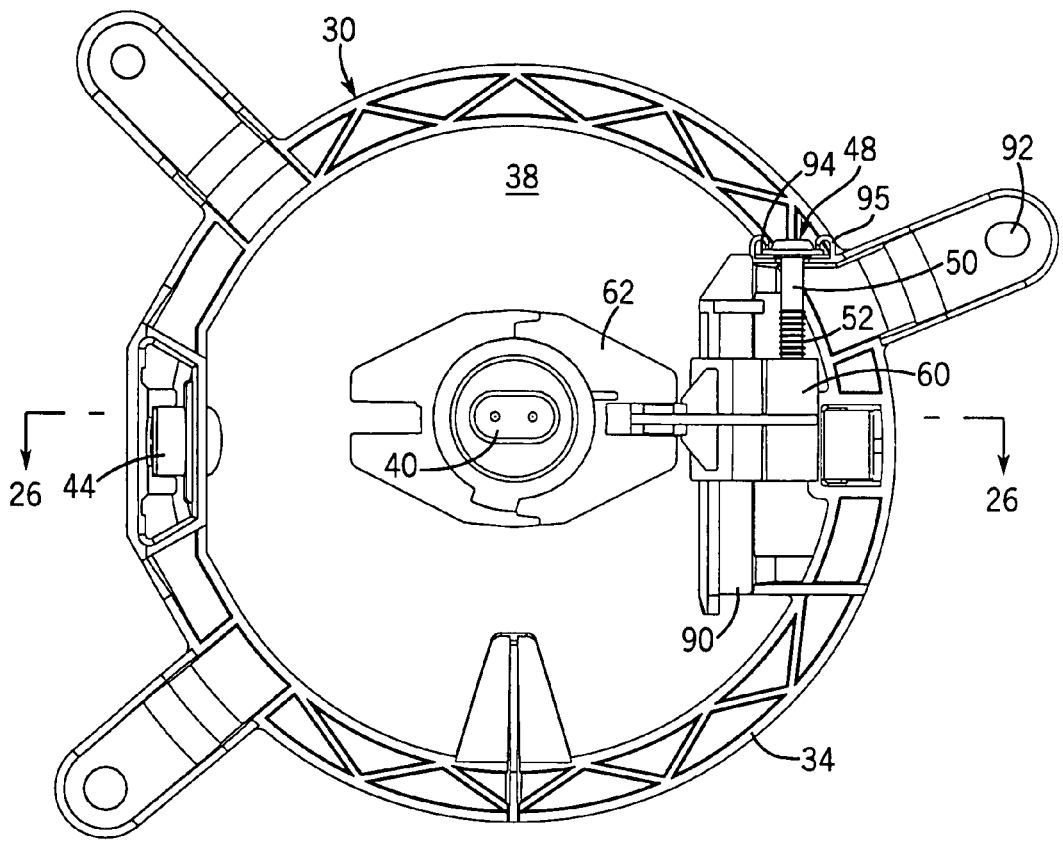
FIG. 25 is a rear plan view of the assembly of FIG. 23.
Figure 26:
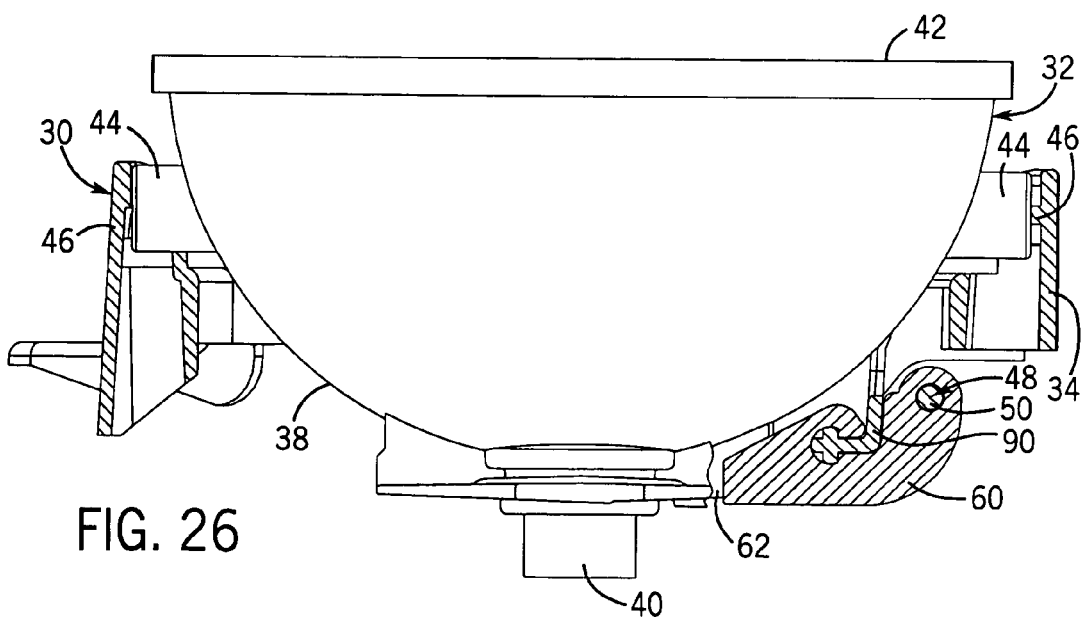
FIG. 26 is a partial cross sectional view of the assembly of FIG. 25 taken along the plane 4-4.
Figure 27:
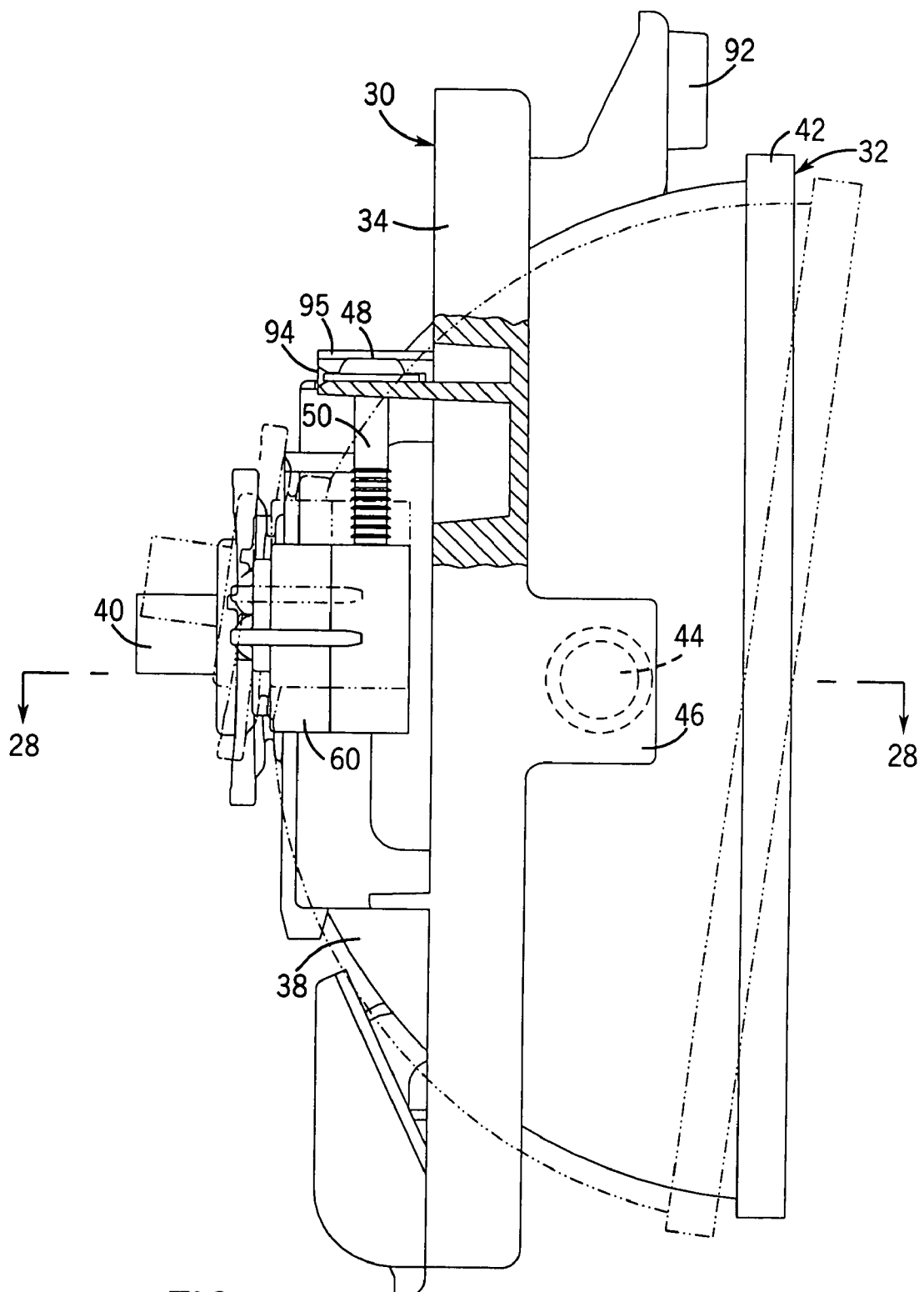
FIG. 27 is a side view, with partial cross section of the assembly of FIG. 23, with the lamp positioned at an alternative shown in phantom.
Figure 28:
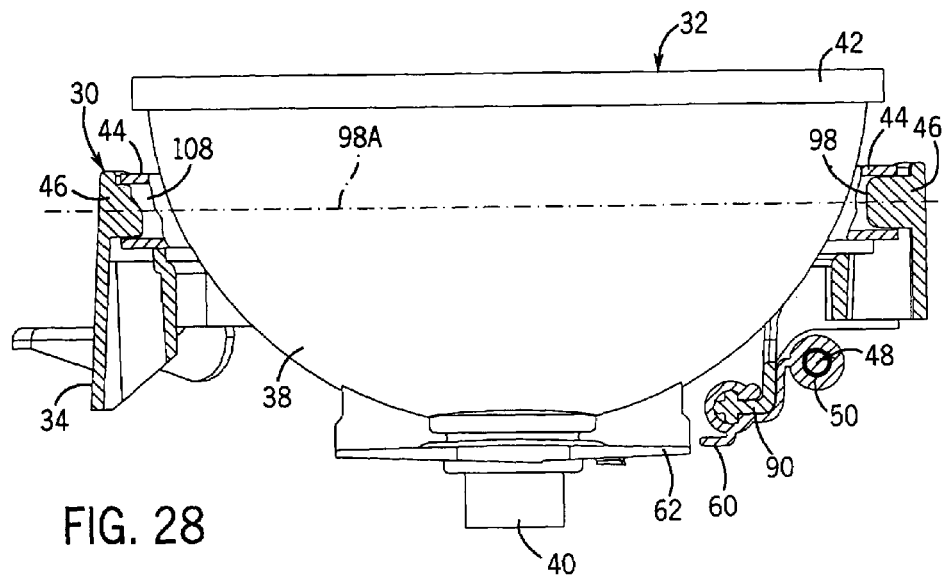
FIG. 28 is a partial cross sectional view of the assembly of FIG. 27 taken along the plane 6-6.
Figure 36:
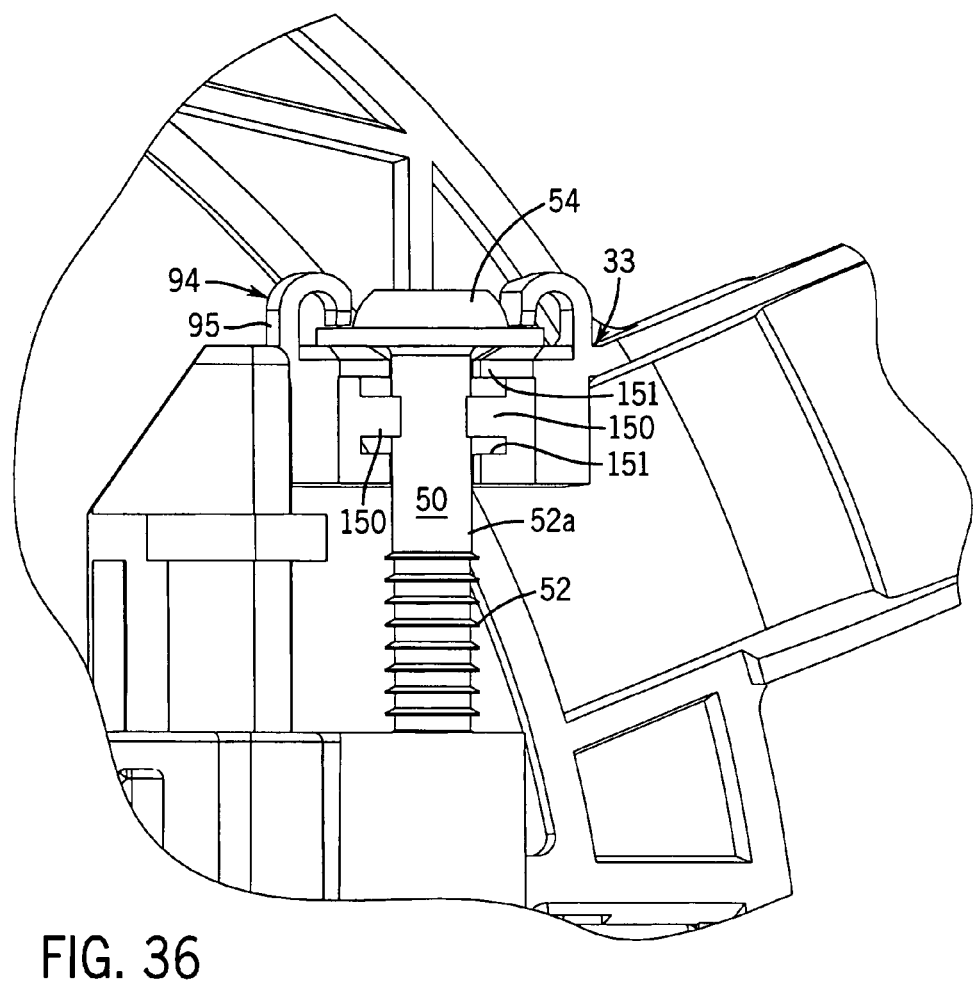
FIG. 36 is a perspective view of an adjuster screw journaled to a receiver in accordance with one embodiment of the current invention.

As in previously described embodiments and shown in FIGS. 24, 25, and 27, an adjuster 48 is provided between the mounting bracket 34 and the reflector 38. The adjuster includes an aiming screw 50 and a screw boss 60. In one embodiment shown in FIG. 35, the aiming screw has a head 54, an end 72, and a threaded portion 52. In one embodiment shown in FIG. 35, the aiming screw 50 does not have any positioning and/or securememt ridge or ridges. As such, an aiming screw 50 in accordance with this embodiment uses less material and costs less to produce than an aiming screw with securement ridges. Alternatively, an aiming screw 50 with a larger diameter head 54 can be produced from the the same amount of material used to produce an aiming screw with a smaller head 54 and securement ridges. A larger diameter head 54 increases the bearing area and axial strength of the connection between the aiming screw 50 and the receiver 33. As shown in FIGS. 25 and 36, the head 54 of the aiming screw 50 may be journaled to the receiver 33 of the mounting bracket 34. As shown in FIG. 36, the receiver 33 has body 130 with a head-retaining bracket 94 and at least one channel 151 connected thereto. The head retaining bracket 94 and the channel 151 may be separate pieces attached to the body 130 and/or may be formed as part of the body 130 of the receiver 33. The head 54 is inserted into the head-retaining bracket 94. In one embodiment shown in FIGS. 24, 25, 27, 36, the head-retaining bracket 94 has at least one arm 95 and preferably a plurality of arms 95. The arms 95 flex in order to receive the aiming screw head 54. Once the head 54 is fit into the head-retaining bracket 94, the arms 95 function to securely hold the head 54 of the aiming screw 50 in the head-retaining bracket 94. The head-retaining bracket 94 allows the head 54 of the aiming screw 50 to rotate, while limiting its axial movement. The arms 95 will allow limited pivotal movement of the head 54.

In one embodiment shown in FIG. 36, the receiver 33 has at least one channel 151 with at least one retaining finger 150 positioned therein. Preferably, the receiver has a channel 151 with a retaining finger 150 on either side of the aiming screw 50. In one embodiment, the channel 151 is generally U-shaped. The retaining finger 150 acts as a snap fit to retain the screw 50 inside the channel 151. Preferably, an unthreaded portion 52a of the screw 50 snap fits into the channel 151. Of course, this type of connection has many applications. For example, this type of connection may be used to journal screws to a variety of structures commonly associated with lamps such as grommets, lens, reflectors, fins, brackets, and the like.

The embodiment shown in FIGS. 23-35 is operated in the same fashion as the previously described embodiments shown in FIGS. 1-7 and 8-14. Th screw boss 60 is threaded to the threaded portion 52 of the aiming screw 50, rotation of the aiming screw 50 causes movement of the screw boss 60 along the axis of the aiming screw 50, corresponding movement of the reflector 38, and pivoting and aiming of the lamp 32. In order to allow for the change of angular orientation of the aiming screw 50 with respect to the reflector 38 when aim adjustment occurs, the head-retaining bracket 94 allows the head 54 of the aiming screw 50 to pivot. In one embodiment, the head-retaining bracket 94 may be formed of a semi-rigid, deformable material such as plastic. Such a construction allows the head-retaining bracket 94 to deform as an adjustment occurs without compromising the structural integrity of the head-retaining bracket 94. Preferably, the head-retaining bracket 94 allows the head 54 to pivot therein and the head-retaining bracket 94 is deformable.

Figure 34:
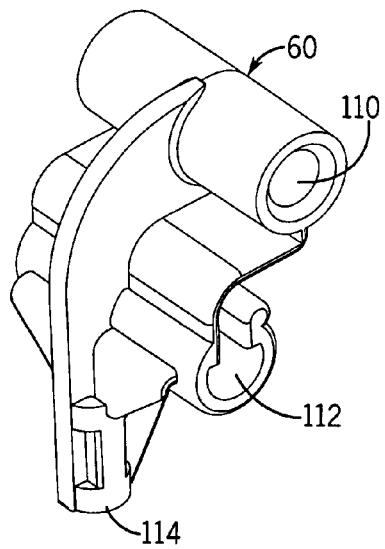
FIG. 34 is a perspective view of a portion of the assembly of FIG. 23.
Figure 35:
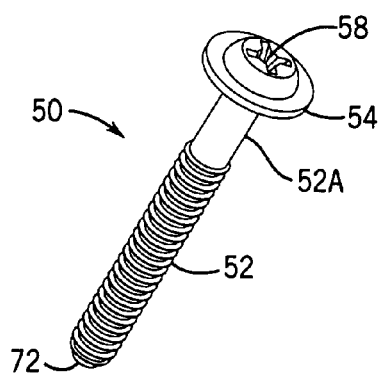
FIG. 35 is a perspective view of a portion of the assembly of FIG. 23.

In assembling the embodiment of the adjuster and bracket assembly 30 reflected in FIGS. 23-35, the aiming screw 50 is fit into the mounting bracket 34 so that the aiming screw 50 is substantially parallel to the angled rail 90. In one embodiment, as shown in FIGS. 26, 28, 29, and 33, the angled rail 90 has an overall L-shape with a T-shaped end. Specifically, the head 54 of the aiming screw 50 is fit into the head-retaining bracket 94 of the mounting bracket 34. As shown in FIG. 34, the screw boss 60 has a threaded portion 110, a rail engagement section 112, and a reflector attachment area 114. The rail engagement section 112 of the screw boss 60 is designed to slidely engage the angled rail 90. As such, the rail engagement section 112 is positioned onto the angled rail 90 and slid up the angled rail 90 so that the screw boss 60 comes into contact with the end 72 of the aiming screw 50. The aiming screw 50 is then fit into the threaded portion 110 of the screw boss 60 whereby the screw boss 60 is functionally engaged to the aiming screw 50. The completed adjuster and bracket assembly 30 is then ready for the attachment of the reflector 38.

Figure 29:
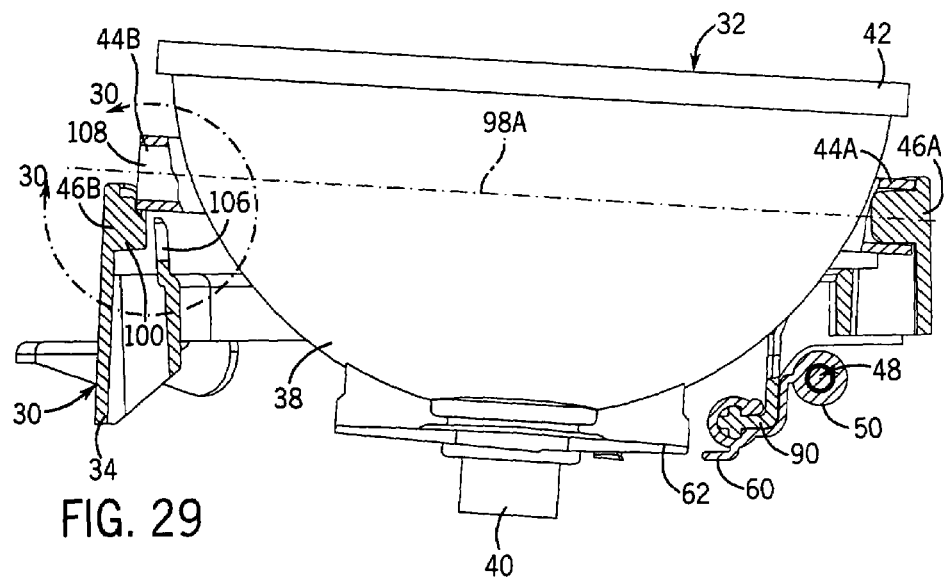
FIG. 29 is a partial cross sectional view of the assembly of FIG. 27 taken along the plane 6-6.
Figure 30:
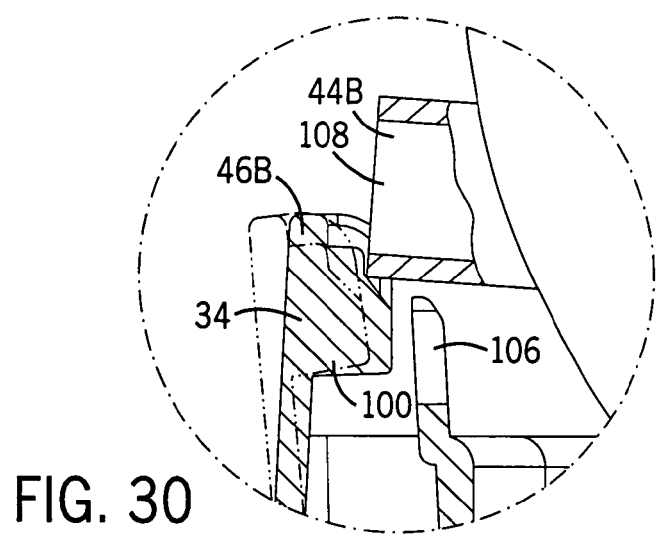
FIG. 30 is a partial cross sectional view of a portion of the assembly of FIG. 29 taken along the plane 8-8.
Figure 31:
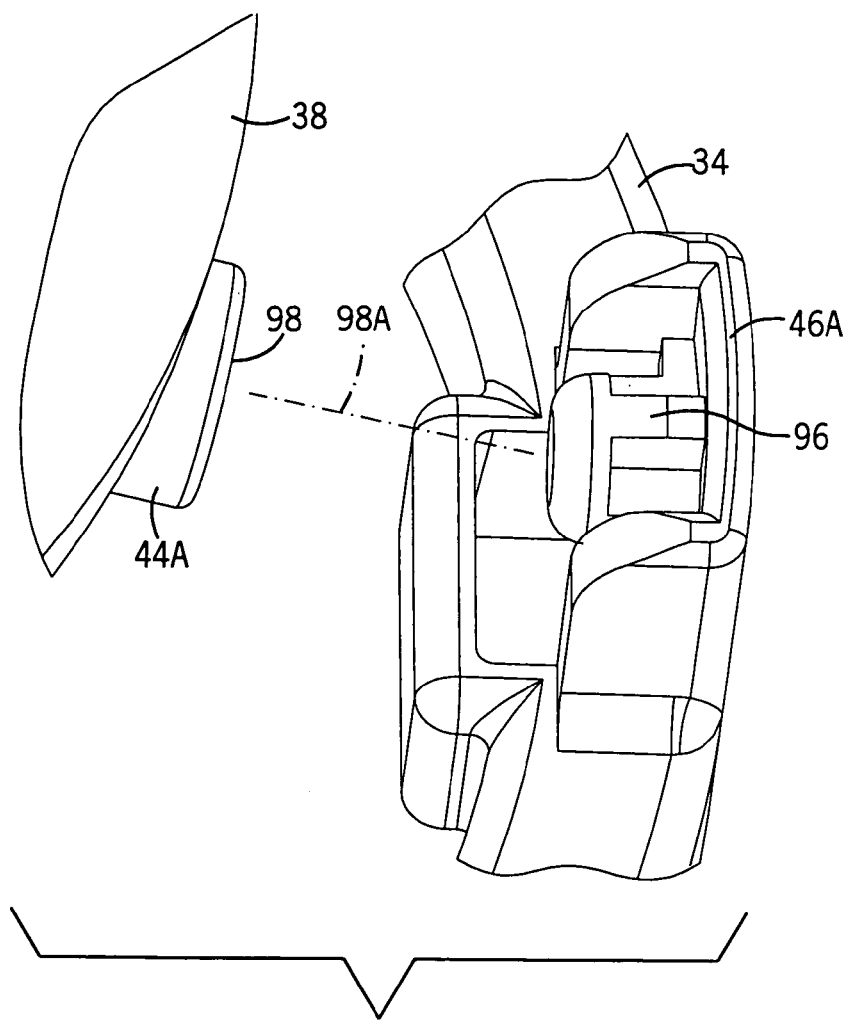
FIG. 31 is a perspective view of a portion of the assembly of FIG. 29.

The adjuster and bracket assembly 30 may be attached to the reflector 38 using any conventional method, such as snap fitting or by fasteners. In one embodiment as shown in FIGS. 29-32, one of the posts 44A of the reflector 38 is inserted into one arm 46A of the bracket assembly 34, then the other post 44B is snap fit into the other arm 46B. Of course, either or both arms may be attached using this method or other methods without departing from this invention. As shown in FIGS. 29 and 31, arm 46A has a knob 96 positioned thereon. As shown in FIGS. 29 and 31, post 44A of the reflector 38 has an orifice 98 designed to mate with the knob 96. The orifice 98 of the post 44A is slid onto and mates with the knob 96 of the arm 46A.

Figure 32:
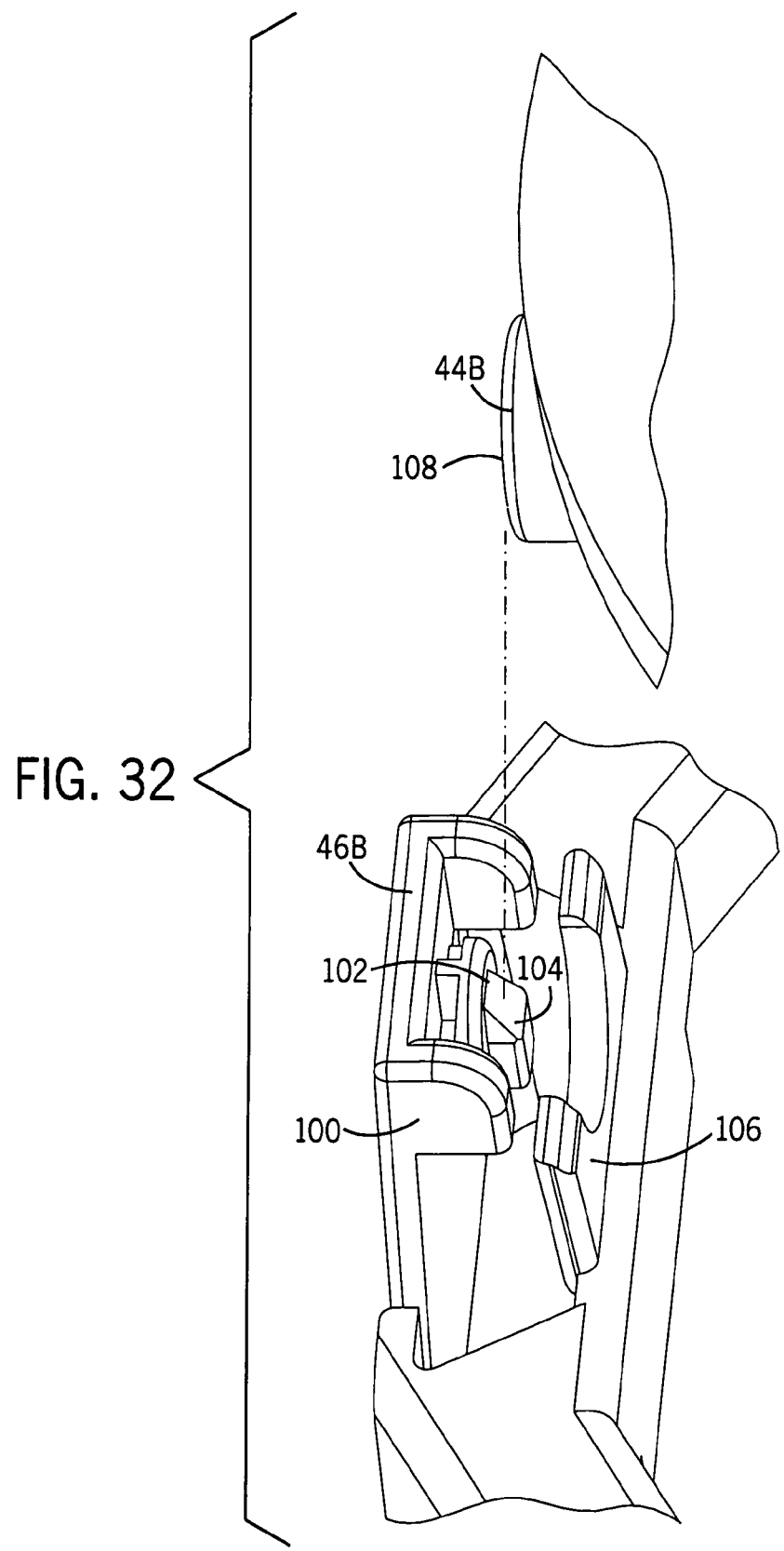
FIG. 32 is a perspective view of a portion of the assembly of FIG. 29.
Figure 33:
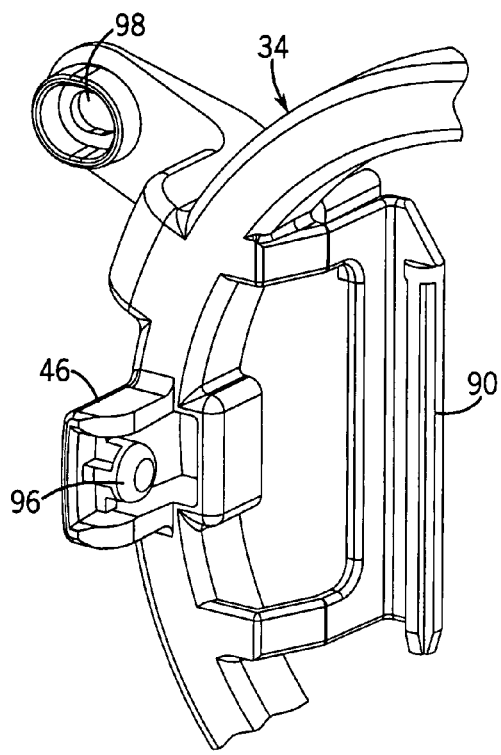
FIG. 33 is a perspective view of a portion of the assembly of FIG. 29, shown without the lamp.

After the orifice 98 has mated with the knob 96 of arm 46B, post 44B is snap fit into arm 46B. As shown in FIGS. 29, 30, and 32, the arm 46B has a clip 100, a finger 102 positioned on the clip 100, and a retainer 106. Post 44B has an engagement 108. The engagement 108 and the orifice 98 may have the same or different configurations, depending on the specific characteristics of the assembly 30 desired. As shown in FIG. 30, as post 44B is snapped onto arm 46, the clip 100 is deformed away from the retainer 106. Once the post 44B reaches a secured position, the clip 100 returns to its resting position, thereby inserting the finger 102 into the engagement 108. Thus in the secured position, the post 44B is secured against the retainer 106 and held in place via the interaction of the finger 102 with the engagement 108 and the clip 100 with the post 44B. The reflector 38 can now rotate about axis 98A within the mounting bracket 34, but is held in rotational position by reflector attachment area 114.

The aiming screw 50 is the rotated causing the screw boss 60 to travel axially along the angled rail 90. Such travel allows proper positioning of the screw boss 60 in relation to a fin 62 on the reflector 38. The reflector attachment area 114 of the screw boss 60 is functionally engaged to the fin 62. In one embodiment, the reflector attachment area 114 of the screw boss 60 snap fits onto the fin 62. The lamp assembly is then complete and ready to be installed to a vehicle.

The adjuster and bracket of the present invention may have other applications aside from use in an automotive lamp assemblies and the invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter of the claims.

I claim:

1. An adjuster and bracket assembly comprising:
   a mounting bracket having a rear surface configured to stationarily mount to a vehicle, a front surface and side edges therebetween, the mounting bracket having stationary arms extending frontwardly from one of the front surface and the side edges of the mounting bracket, the stationary arms dimensioned to pivotally receive a reflector; and,
   an adjuster secured to the rear surface of the mounting bracket such that when the reflector is pivotally received by the stationary arms of the mounting bracket after the adjuster has been secured thereto, the adjuster communicates with the reflector such that rotation of an aiming screw within the adjuster causes pivoting of the reflector within the stationary arms of the mounting bracket.

2. The adjuster and bracket assembly of claim 1 wherein the reflector is snap-fitted onto at least one of the stationary arms of the mounting bracket.

3. The adjuster and bracket assembly of claim 1 wherein the mounting bracket has a head retaining bracket, the aiming screw of the adjuster fitted into the head retaining bracket.

4. The adjuster and bracket assembly of claim 1 wherein the reflector has a plurality of posts, and wherein each of the stationary arms of the mounting bracket functionally engage one of the posts such that actuation of the adjuster causes the reflector to pivot on the posts.

5. An adjuster and bracket assembly comprising:
   a mounting bracket, having stationary arms extending forwardly therefrom, the stationary arms dimensioned to pivotally receive a reflector; and,
   an adjuster secured to the mounting bracket such that when the reflector is pivotally received by the stationary arms of the mounting bracket after the adjuster has been secured thereto, the adjuster communicates with the reflector such that rotation of an aiming screw within the adjuster causes pivoting of the reflector within the stationary arms of the mounting bracket, wherein the aiming screw has a screw boss threaded thereon, the screw boss in communication with the reflector when the reflector is pivotally received by the mounting bracket such that rotation of the aiming screw causes the screw boss to move along the aiming screw resulting in a pivoting of the reflector.

6. The adjuster and bracket assembly of claim 5 wherein the screw boss mates with a fin extending from the reflector when the reflector is pivotally received by the mounting bracket.

7. The adjuster and bracket assembly of claim 6 wherein the screw boss has a tab that engages a slot in the fin when the reflector is pivotally received by the mounting bracket.

8. The adjuster and bracket assembly of claim 6 wherein the screw boss has at least one engagement channel that engages a slot in the fin when the reflector is pivotally received by the mounting bracket.

9. The adjuster and bracket assembly of claim 5 wherein the screw boss is slidingly engaged to the mounting bracket.

10. The adjuster and bracket assembly of claim 9 wherein the screw boss is in sliding engagement with a rail on the mounting bracket such that rotation of the aiming screw causes the screw boss to slide along the rail resulting in pivoting of the reflector.

11. The adjuster and bracket assembly of claim 10 wherein the rail is substantially parallel to the aiming screw.

12. A lamp assembly comprising:
    a lamp having a lens, a reflector and a bulb;
    a mounting bracket having a rear surface configured to be stationarily secured to a vehicle and a front surface, having stationary arms extending frontwardly therefrom, the stationary arms dimensioned to pivotally receive the reflector; and,
    an adjuster secured to the rear surface of the mounting bracket such that the reflector is pivotally receivable by the stationary arms of the mounting bracket after the adjuster has been secured to the mounting bracket, the adjuster communicates with the reflector when the reflector is received by the mounting bracket such that rotation of an aiming screw within the adjuster causes pivoting of the reflector within the stationary arms of the mounting bracket.

13. The lamp assembly of claim 12 further comprising a screw boss threaded onto the aiming screw and slidingly engaged to the mounting bracket.

14. The lamp assembly of claim 12 where the reflector snap fits into the mounting bracket.

15. A lamp assembly comprising:
    a lamp having a lens, a reflector and a bulb;
    a mounting bracket, having stationary arms extending forwardly therefrom, the stationary arms dimensioned to pivotally receive the reflector; and,
    an adjuster secured to the mounting bracket such that the reflector is pivotally receivable by the stationary arms of the mounting bracket after the adjuster has been secured to the mounting bracket, the adjuster communicates with the reflector when the reflector is received by the mounting bracket such that rotation of an aiming screw within the adjuster causes pivoting of the reflector within the stationary arms of the mounting bracket; and
    a screw boss threaded onto the aiming screw and slidingly engaged to the mounting bracket, wherein the screw boss slides along a guide rail extending from the mounting bracket.

16. The lamp assembly of claim 15 where the guide rail is substantially parallel to the aiming screw.

17. A lamp assembly comprising:
    a mounting bracket having a rail; and,
    an adjuster secured to the mounting bracket such that the adjuster and mounting bracket form a unit having stationary arms extending forwardly therefrom which pivotally receive a reflector, where the adjuster has:
    an aiming screw journaled by the mounting bracket; and,
    a screw boss functionally engaged to the aiming screw, slidely engaged to the rail, and functionally engaged to the reflector such that rotation of the aiming screw causes the screw boss to move along the axis of the aiming screw and slide along the rail thereby pivoting the reflector within the stationary arms of the unit.

18. The lamp assembly of claim 17 wherein the rail and the aiming screw are substantially parallel to one another.

19. The lamp assembly of claim 17 wherein the reflector snap fits into the unit.

* * * * *